US007090455B2

(12) United States Patent
Lamb

(10) Patent No.: US 7,090,455 B2
(45) Date of Patent: Aug. 15, 2006

(54) STACKED ASSEMBLY OF ROOFING CAPS

(75) Inventor: Frederick W. Lamb, Alabaster, AL (US)

(73) Assignee: PneuTools, Incorporated, Memphis, TN (US)

( * ) Notice: Subject to any disclaimer, the term of this patent is extended or adjusted under 35 U.S.C. 154(b) by 4 days.

(21) Appl. No.: 10/823,436

(22) Filed: Apr. 12, 2004

(65) Prior Publication Data

US 2004/0197162 A1 Oct. 7, 2004

Related U.S. Application Data

(60) Continuation-in-part of application No. 10/435,737, filed on May 9, 2003, now abandoned, which is a division of application No. 09/648,335, filed on Aug. 25, 2000, now abandoned, which is a continuation-in-part of application No. 09/438,983, filed on Nov. 12, 1999, now Pat. No. 6,302,310.

(60) Provisional application No. 60/160,672, filed on Oct. 21, 1999, provisional application No. 60/150,534, filed on Aug. 25, 1999, provisional application No. 60/108,174, filed on Nov. 13, 1998.

(51) Int. Cl.
*F16B 43/00* (2006.01)
*B65D 85/00* (2006.01)

(52) U.S. Cl. ....................... 411/531; 411/442; 206/338; 206/445

(58) Field of Classification Search ................ 411/442, 411/445, 443, 531; 206/303, 338, 348, 445
See application file for complete search history.

(56) References Cited

U.S. PATENT DOCUMENTS 239,111 A * 3/1881 O'Meara .................... 206/303
1,560,938 A 11/1925 Lund
1,590,172 A 6/1926 Thorberg
2,052,063 A * 8/1936 Wenn ......................... 411/531
2,385,521 A 9/1945 Mead
2,886,815 A 5/1959 Young
2,939,147 A 6/1960 Jacobson
3,180,489 A 4/1965 McGinn
3,261,526 A 7/1966 Novak
3,339,720 A * 9/1967 Barnes ....................... 206/343
3,595,460 A 7/1971 Pitkin
3,604,608 A 9/1971 Mullaney
3,633,810 A 1/1972 Krakauer (Continued)

*Primary Examiner*—Flemming Saether
(74) *Attorney, Agent, or Firm*—Walker, McKenzie & Walker, P.C.

(57) ABSTRACT

A staple or nail gun assembly includes a staple or nail gun, a cap feeding device and a cap having a peripheral rim disposed on its underside, a marginal edge on its upper side adjacent a central portion having the shape of a truncated cone. The staple or nail gun and the cap feeding device are generally disposed at opposite ends of the handle of the staple or nail gun. The cap feeding device includes a base, a cap container and a shuttle, and feeds caps sequentially as they are affixed by the gun. The caps are coaxially stacked by means of a coaxial plastic cord or wire with retaining means at the respective ends or in a tubular container with a flanged end. The caps may also be stacked on a rod or held together by melting.

1 Claim, 19 Drawing Sheets

U.S. PATENT DOCUMENTS 3,734,377 A 5/1973 Munn
4,033,499 A 7/1977 Butler
4,039,078 A * 8/1977 Bone .......................... 206/343
4,194,621 A * 3/1980 Lange ........................ 206/343
4,251,017 A 2/1981 Doyle et al.
4,300,684 A 11/1981 Smith
D263,927 S 4/1982 Dewey
4,339,065 A 7/1982 Haytayan
4,424,929 A 1/1984 Weis
4,686,808 A 8/1987 Triplett
4,726,164 A 2/1988 Reinwall et al.
4,780,039 A 10/1988 Hartman
4,890,968 A 1/1990 Beach et al.
5,042,142 A 8/1991 Beach et al.
5,069,589 A 12/1991 Lemke
5,082,412 A 1/1992 Thomas
5,110,247 A 5/1992 Losada
5,163,580 A 11/1992 Beach
5,178,503 A 1/1993 Losada
5,184,752 A 2/1993 Zylka et al.
5,261,770 A 11/1993 Hoepker et al.
5,347,707 A 9/1994 Beach
5,407,313 A 4/1995 Bruins et al.
5,445,297 A 8/1995 Beach et al.
5,529,451 A 6/1996 Bruins et al.
5,634,583 A 6/1997 McGuinness et al.
5,755,545 A 5/1998 Banks
5,791,546 A 8/1998 McGuinness et al.
5,921,454 A 7/1999 Larson et al.
5,927,497 A 7/1999 Baumgartner
5,927,922 A * 7/1999 Miller ........................ 411/444
5,934,504 A 8/1999 Elliott
5,947,362 A 9/1999 Omli
6,010,291 A 1/2000 Schwingle
6,065,660 A 5/2000 Cabrera
6,302,310 B1 10/2001 Lamb
6,481,601 B1 11/2002 Steen
6,502,719 B1 1/2003 Huang
6,669,428 B1 * 12/2003 Autterson et al. .......... 411/531

* cited by examiner

STACKED ASSEMBLY OF ROOFING CAPS

CROSS-REFERENCE TO RELATED APPLICATIONS

This application is a continuation-in-part of pending U.S. Non-Provisional application Ser. No. 10/435,737 (filed May 9, 2003), also entitled "Stacked Assembly of Roofing Caps" and fully included herein by reference, and claims priority benefit thereof and of the parent applications of said application Ser. No. 10/435,737. application Ser. No. 10/435,737, in turn, was a division of pending U.S. Non-Provisional application Ser. No. 09/648,335 (filed Aug. 25, 2000), entitled "Staple or Nail Gun Assembly, Cap Gun Feeding Device for Staple or Nail Gun, and Cap Assembly" and fully included herein by reference, and claims priority benefit thereof and of the parent applications of said application Ser. No, 09/648,335. application Ser. No. 09/648,335, in turn, was a continuation-in-part of U.S. Non-Provisional application Ser. No. 09/438,983 (filed Nov., 12, 1999), entitled "Staple or Nail Gun Assembly, Cap Feeding Device for Staple or Nail Gun, and Cap Assembly" and claimed priority benefit of said application Ser. No. 09/438,983, which has now issued as U.S. Pat. No. 6,302,310 (issued Oct. 16, 2001). application Ser. No. 09/648,335 also claimed priority benefit of U.S. Provisional Application 60/150,534 (filed Aug. 25, 1999), entitled "Stacked Felt Caps for the Rapid Feeding Felt Cap Gun," and also claimed priority benefit of U.S. Provisional Application 60/160,672 (filed Oct. 21, 1999), entitled "Stacked Feltcaps Held Together with Plastic Line or Wire or Tube." application Ser. No. 09/438,983, in turn, claimed priority of U.S. Provisional Application 60/108,174 (filed Nov. 13, 1998), entitled "Rapid Feeding Felt Cap Gun & Felt Caps Glued Together."

STATEMENT REGARDING FEDERALLY SPONSORED RESEARCH OR DEVELOPMENT

Not applicable.

REFERENCE TO COMPACT DISC(S)

Not applicable.

FIELD OF THE INVENTION

This invention relates to a cap feeding device for a staple or nail gun, as well as a staple or nail gun assembly and a cap assembly for use with a cap feeding device.

BACKGROUND OF THE INVENTION

Automatic nail guns, powered by compressed air or electricity, are used, for example, to attach roofing material, such as tarpaper, to the roof of a house. A generally flat cap is often used with each nail. A nail penetrates the cap and the tarpaper and protrudes into the underlying roof structure, attaching the roofing material to the roof surface.

Typically, an operator must manually place and hold a cap under the nose of a nail gun and then trigger the gun to drive a nail through the cap into the roof structure. The manual placement of caps presents a serious safety hazard to the operator because the operator's hand is close to the nose of the gun when a nail is driven through the nose of the gun. In addition, manual placement of caps is time-consuming and inefficient.

A cap feeding device may be employed to reduce the risk associated with manual placement of caps and to improve the efficiency of roofing operation. The cap feeding device automatically places a cap under the nose of a nail gun, and then the nail gun drives a nail through the cap and into the underlying roof structure.

A conventional cap feeding device generally includes a cap container and a base having a channel. The base extends between the cap container and a position under the nose of the nail gun. Caps are fed into the channel of the base from the cap container and pushed to the position under the nose of the nail gun. When the gun is triggered, a nail penetrates and dislodges the cap under the nose of the nail gun and protrudes into the underlying roof structure. The feeding of the caps under the nose of the nail gun is coordinated with the ejection of the nails through the nose of the nail gun, so that a cap is placed under the nose of the gun before the gun is triggered to expel a nail.

Conventional cap feeding devices have a number of drawbacks. For example, conventional cap feeding devices are generally heavy, putting additional stress on the operator's hand holding the nail gun. Also, many conventional cap feeding devices can only be installed close to the front end of a nail gun, making the nail gun not only heavy but also unbalanced with most of the weight placed at the front end of the gun. This makes the nail gun difficult to handle and may put stress on the operator's hand and wrist. In addition, with so many components placed near the nose of the gun, it is difficult to see the position of the nose of the gun, making a precise placement of a nail difficult.

The conventional cap feeding devices are installed close to the front end of the gun because designers need to place a conventional cap container close to the nose of the gun to reduce the weight of the cap feeding device. The reason is that in many devices a cap is pushed directly from the cap container to a position under the nose of the nail gun. Thus, if the cap container is far from the nose of the gun, a long shuttle is needed to push a cap from the container to the position under the nose of the nail gun through the channel of the base. In addition, an actuator, such as an air cylinder, with a long displacement is also needed to drive the shuttle. The displacement of the actuator should be about the same as the distance between the cap container and the nose of the nail gun. A long shuttle and actuator increase the weight and size of the cap feeding device. With the cap feeding device placed near the nose of the gun, the shuttle and actuator, thus the cap feeding device can be made lighter, smaller and less expensive.

Caps for automatic nailing guns are available in a wide variety of shapes and packaging. Most caps for felt roofing products are sold in bulk and must be applied singularly with each nailing operation. Automatic nailers for roofing including magazines containing caps are available, however, for a variety of reasons, have not found wide usage. Most of the disadvantages of nailers including magazines of roofing caps are related to the unwieldiness of the apparatus, and somewhat to the lack of reliability or uniformity of operation. Automatic nailing machines adapted for installing roofing caps are illustrated in such as U.S. Pat. No. 5,947,362 to Omli; U.S. Pat. Nos. 5,445,297; 5,184,752; and 5,042,142. None of these prior automatic roofing nailers provide the versatility and ease of usage, incorporate the use of an inventive roofing cap or disclose a convenient packaging of stacked caps which may be readily inserted into the magazine of an automatic roofing nailer. Not only does the cap of the present invention lend itself to convenient packaging, but it also provides superior reliability in its ability to be routinely fed through the magazine chamber of the nailing machine for reliable operation, but the configuration which provides the fit, reliability and stackability also provides a cap which delivers superior performance in holding the material to be attached such as roofing felt to the roof or siding materials.

SUMMARY OF THE INVENTION

This invention provides a compact, light-weight cap feeding device that overcomes the problems associated with conventional nail guns and cap feeding devices.

In accordance with one aspect of the invention, a device, which is used to feed, staple or nail caps having a diameter, includes a base, a container and a shuttle. The base includes cap feeding and cap holding chambers, and a channel connecting the two chambers. The distance between the cap feeding and cap holding chambers is at least twice the diameter of the caps. The container has a generally cylindrical configuration and is substantially perpendicular to the base. The container is operatively associated with the cap feeding chamber and is adapted to feed caps stored in the container into the cap feeding chamber one cap at a time. The shuttle is adapted to slide within the channel of the base and is adapted to move a cap at the cap feeding chamber through the channel towards the cap holding chamber by a distance equal to a diameter of the cap.

In accordance with another aspect of the invention, a staple or nail gun assembly includes a staple or nail gun and a cap feeding device. The staple or nail gun has a head portion and a handle portion. The head portion has an opening through which a staple or nail is expelled. The handle portion has first and second ends, the first end being attached to the head portion. The cap feeding device includes a base, a container and a shuttle. The base includes cap feeding and cap holding chambers, and a channel connecting the two chambers. The distance between the cap feeding and cap holding chambers is at least twice the diameter of the caps. The container has a generally cylindrical configuration and is substantially perpendicular to the base, facilitating the transfer of caps from the container to the cap feeding chamber. The container is operatively associated with the cap feeding chamber and is adapted to feed caps stored in the container into the cap feeding chamber one cap at a time. The shuttle is adapted to slide within the channel of the base and is adapted to move a cap at the cap feeding chamber through the channel towards the cap holding chamber by a distance equal to a diameter of the cap.

In accordance with a further aspect of the invention, a cap assembly for use with a cap feeding device includes a plurality of concentrically stacked staple or nail caps. Each cap has two opposite surfaces, and at least one of the surfaces of each cap is attached to one of the surfaces of another cap.

The cap feeding device and the staple or nail gun assembly of the present invention are compact and light-weight and thus have a number of advantages over the prior art. The weight of a staple or nail gun assembly in accordance to the present invention is substantially balanced. The weight of the staple or nail gun is mostly located at the front end of the gun handle, while the weight of the cap feeding device, especially the weight of the cap container, is mostly located at the rear end of the gun handle. Further, although the cap container is not placed near the nose of the gun, an actuator with a long displacement is not needed because a cap is not pushed directly from the cap feeding chamber to the cap holding chamber. The cap in the cap feeding chamber is pushed by the shuttle towards the cap holding chamber by a distance equal to the diameter of the cap (if the cap is circular). This cap pushes the cap in front of it in the channel towards the cap holding chamber by the same distance. The last cap is pushed into the cap holding chamber, where a staple or nail penetrates the cap in the cap holding chamber when the gun is triggered. In other words, there are at least three caps in the channel of the base, one at the cap feeding chamber, one at the middle position and one at the cap holding chamber. Each time after the gun is triggered, the caps are moved towards the cap holding chamber by a distance equal to the diameter of the caps. In addition, because most of the components of the cap feeding device are not located near the nose of the gun, an operator is able to see the nose of the gun better, allowing him to more precisely aim the nose of the gun.

Additional objects of the present invention are roofing caps having a disk-like circular shape including a peripheral ridge on the lower surface of the cap and a central portion being in the shape of a truncated cone exhibiting a flat plateau in the central portion of the truncated cone. Alternative embodiments of the cap include a lateral peripheral rim on the upper surface of the cap providing a complimentary surface for receiving the peripheral ridge of the adjacent stacked cap.

In accordance with still further objectives of the present invention are stacking means by which a plurality of caps may be stacked in vertical relation and retained for inventory and shipment and later inserted into the magazine of a nailing machine with a minimum of effort. Alternative embodiments of such stacking means include the caps having a hole centrally disposed in the plateau whereby a plastic cord or wire may be strung through the adjacent holes of stacked caps in which the lower portion of the cord or wire is terminated by a releasable fixture and the upper end may be terminated with such as a loop. Alternative means of stacking caps within the invention include caps having disposed thereon a retaining stud on the upper or lower surface of the cap and the opposite surface having a complementary receiving hole disposed therein. Additional alternative means of stacking caps include a skewer rod through the caps or melting the caps together in a stacked assembly. The inventive caps may similarly be retained in stacks by means of an adhesive, such as a hot melt adhesive, disposed between adjacent surfaces of stacked caps.

BRIEF DESCRIPTION OF THE DRAWINGS

FIG. 17 is a side and partial sectional view of the fourth alternative embodiment.

FIG. 18 is an enlarged view of the tip of the retaining rod of the fourth alternative embodiment.

FIG. 19 is an enlarged view of the fourth alternative embodiment showing the piercing of the bottom cap by the tip of the retaining rod.

FIG. 20 is a front side view of a stack of caps assembled according to the fifth alternative embodiment. The view from the back side is substantially identical.

FIG. 21 is a top view of the stack of caps of FIG. 20, taken substantially along the line 21—21 shown in FIG. 20.

FIG. 22 is an end view of the sled used in making the stack of caps assembled according to the fifth alternative embodiment, showing the lid of the sled being opened in dotted outline.

FIG. 23 is a top view of the sled used in making the stack of caps assembled according to the fifth alternative embodiment, showing the lid of the sled opened.

FIG. 24 is a front view of the sled of the fifth alternative embodiment shown passing between the laser melting means.

DETAILED DESCRIPTION OF THE PREFERRED EMBODIMENTS

Figure 1:
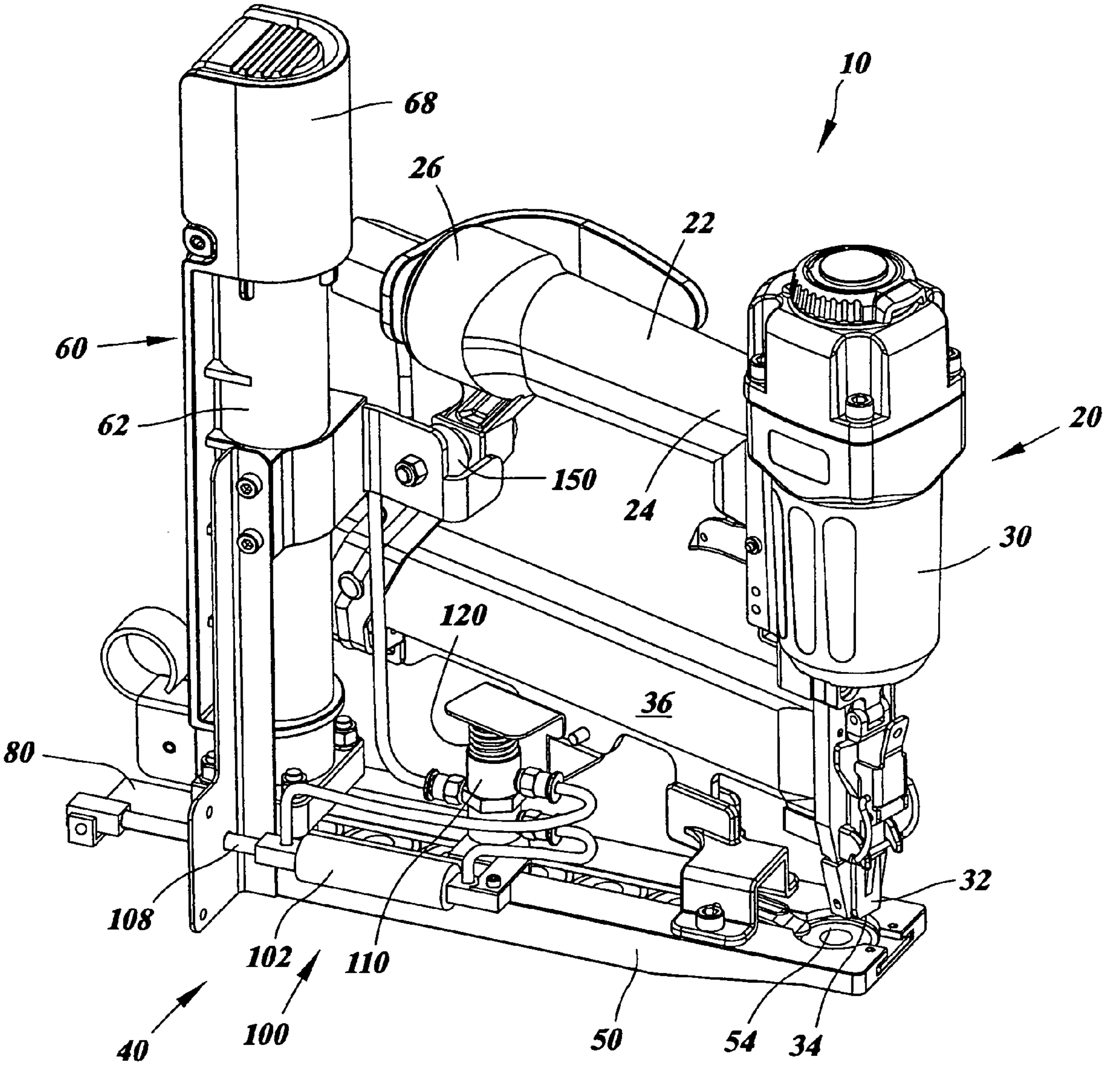
FIG. 1 is a perspective view of a staple or nail gun assembly according to the present invention.

FIGS. 1–8 illustrate one example of the staple or nail gun assembly 10 of the present invention. The staple or nail gun assembly 10 includes a staple or nail gun 20 and a cap feeding device 40. The staple or nail gun 20 has a handle portion 22 and a head portion 30. The handle portion 22 has front and rear ends 24, 26, the front end 24 being attached to the head portion 30. The cap feeding device 40 includes a base 50, a cap container 60 and a shuttle 80. The base 50 includes a cap feeding chamber 52 and a cap holding chamber 54, and a channel 56 connecting the two chambers 52, 54. The container 60 is used to store staple or nail caps 140 and to feed the caps 140 to the cap feeding chamber 52 of the base 50 one cap at a time. The shuttle 80 is movably disposed in the channel 56 of the base 50 and is adapted to move a cap at the cap feeding chamber 52 towards the cap holding chamber 54 through the channel 56.

In the preferred embodiment shown in FIG. 1, the staple or nail gun 20 is an automatic nail gun powered by compressed air, although any staple or nail gun can be used with an embodiment of present invention, including a staple or nail gun powered, for example, by electricity. The head portion 30 of the nail gun 20 includes a nose portion 32 and a barrel having an opening 34 at the nose portion 32. The nail gun 20 may also include a nail container 36 connected to the head portion 30. The nail container 36 holds a plurality of nails and feeds the nails into the barrel one nail at a time. The head portion 30 may also include a piston-cylinder arrangement, in which a piston is movably disposed in a cylinder and divides the cylinder into first and second chambers. When the nail gun 20 is triggered, compressed air is supplied to the first chamber of the cylinder to push the piston towards the nail in the barrel. The piston strikes the nail in the barrel to eject the nail through the opening 34 at the nose portion 32. Then compressed air can be supplied to the second chamber to return the piston to the retracted position. Alternatively, the piston may be returned to the retracted position with any alternative device such as a spring. Because the head portion 30, which contains most of the nail gun components, is disposed at the front end 24 of the handle portion 22, the weight of the staple or nail gun 20 is mostly placed at the front end 24 of the handle 22.

As stated above, the cap feeding device 40 includes a base 50, a cap container 60 and a shuttle 80. The base 50 has a cap feeding chamber 52 and a cap holding chamber 54, and a channel 56 connecting the two chambers 52, 54. The container 60 is used to store nail caps 140 and to feed the caps 140 to the cap feeding chamber 52 of the base 50 one cap at a time. The shuttle 80 is operatively associated with the channel 56 of the base 50 and pushes a cap at the cap feeding chamber 52 towards the cap holding chamber 54 through the channel 56.

Figure 2:
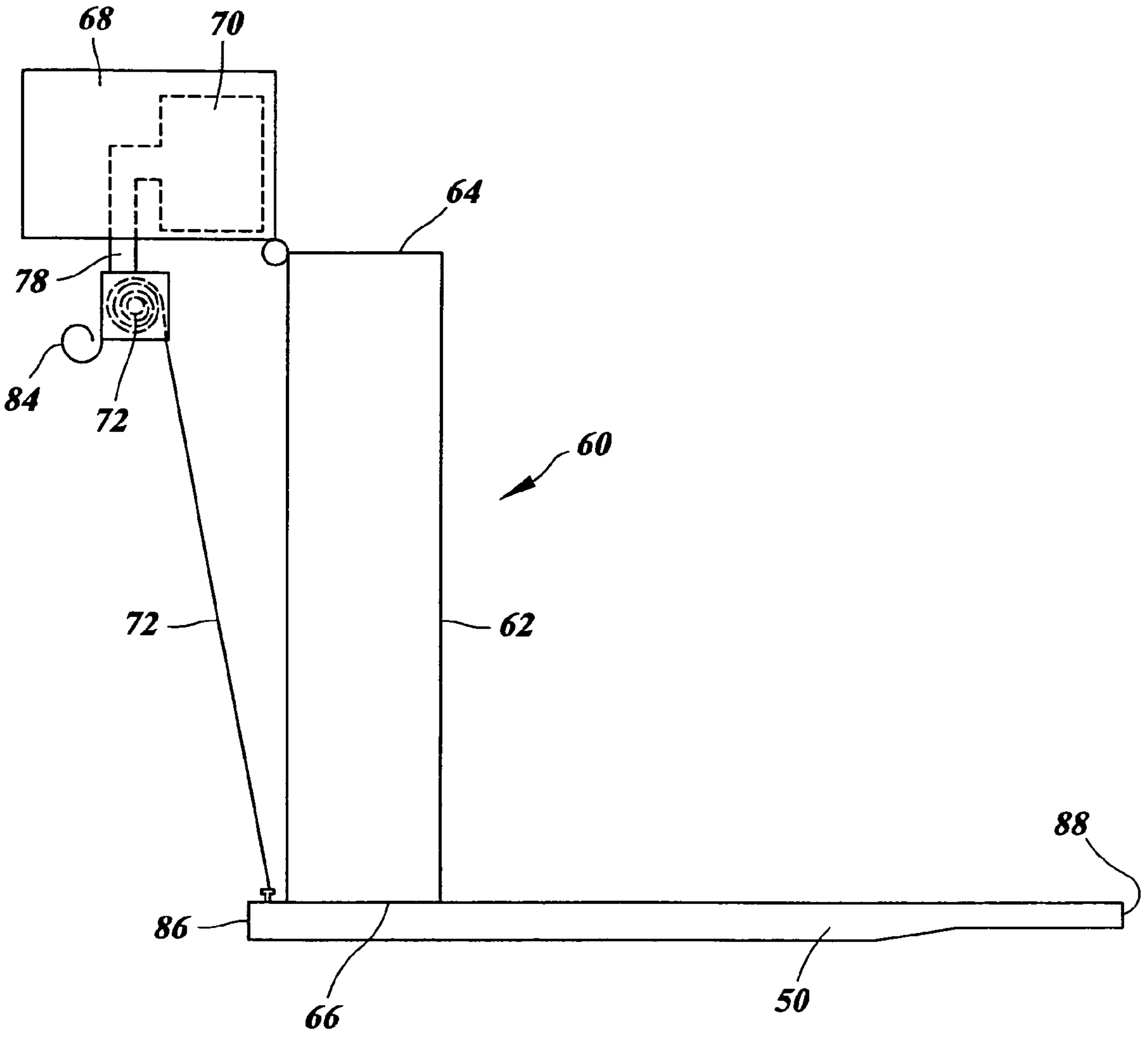
FIG. 2 is a side view of a cap container of the embodiment shown in FIG. 1, where the cover is in the open position.
Figure 3:
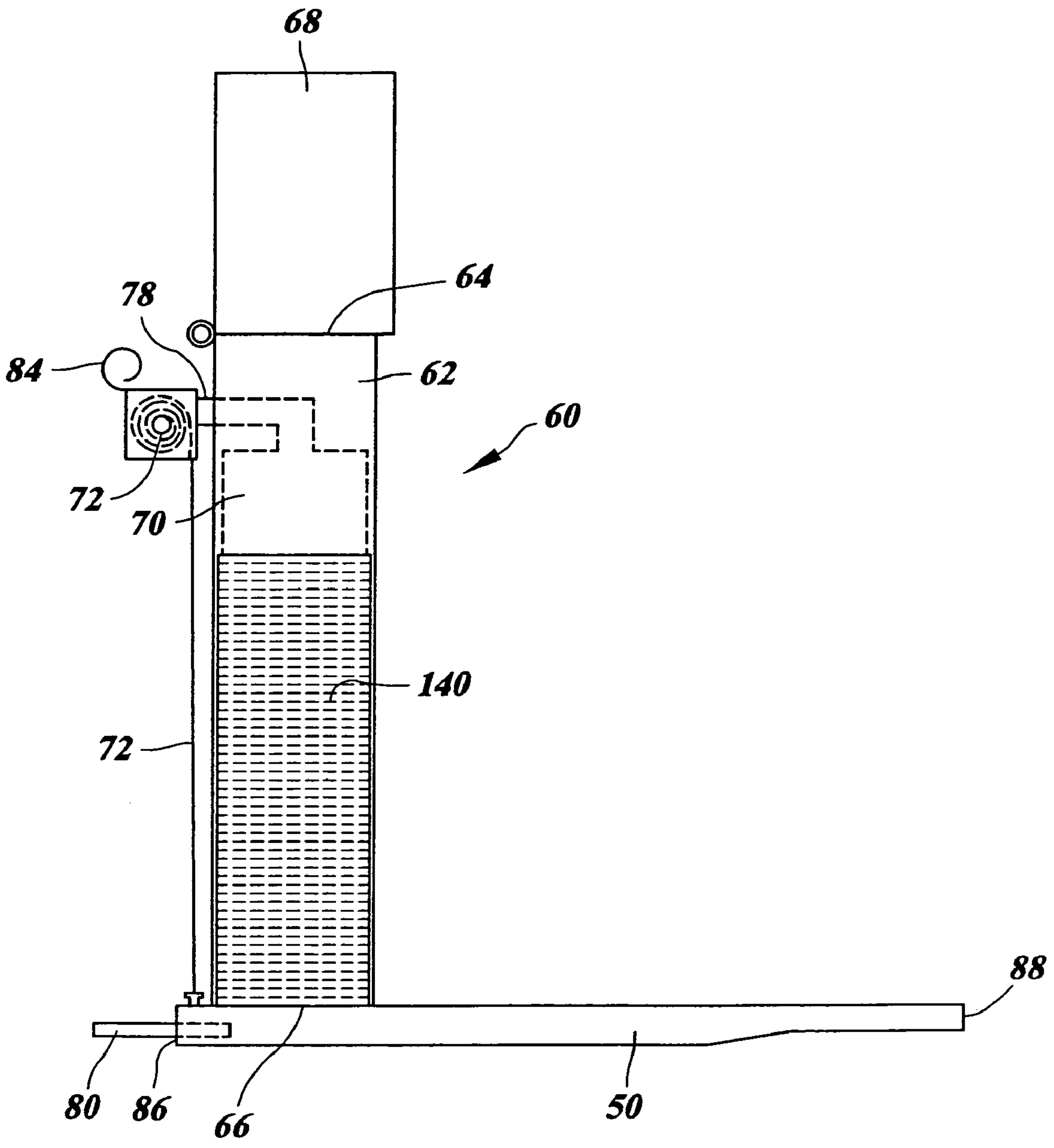
FIG. 3 is the side view of the cap container shown in FIG. 2, where the cover is in the closed position.
Figure 4:
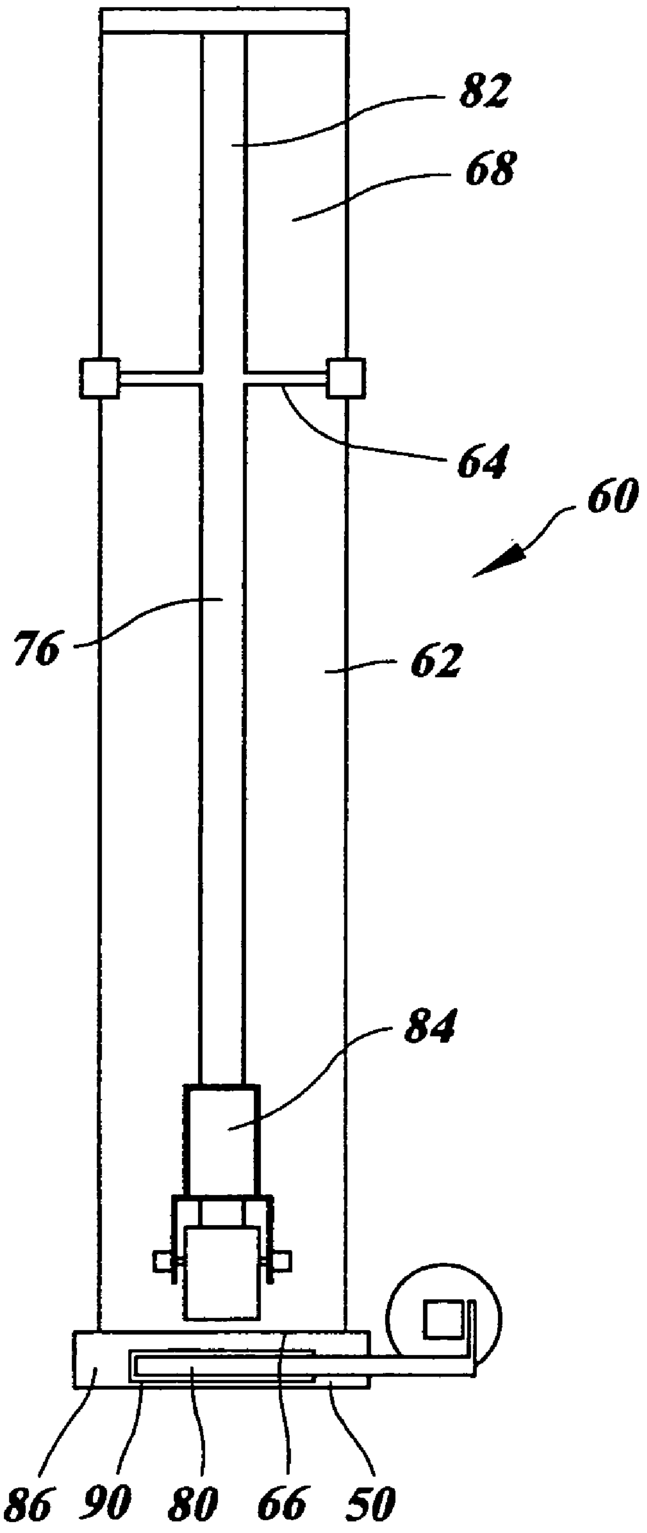
FIG. 4 is a rear view of the cap container shown in FIGS. 2 and 3.

As illustrated in FIGS. 2–4, the cap container 60 includes a hollow tubular portion 62 having first and second open ends 64, 66, and a cover 68 pivotably connected to the tubular portion 62 at the first open end 64. The second open end 66 of the tubular portion 62 is aligned with the cap feeding chamber 52 of the base 50, and the caps 140 in the container 60 are fed to the cap feeding chamber 52 through the second open end 66. In this embodiment, the tubular portion 62 is attached to the base 50 with a plurality of bolts and nuts. In the illustrated preferred embodiment, the tubular portion 62 is perpendicular to the base 50. The container 60 also includes a plunger 70, which may be disposed in the tubular portion 62 or disposed in the cover 68, and a spring 72, such as a ribbon spring 72 shown in FIGS. 2–4, pulling the plunger 70 towards the second end 66 of the tubular portion 62. The spring force biases the plunger 70 against the stack of caps 140 in the direction of the second end 66 to ensure that the outermost cap at the second end 66 is disposed in the cap feeding chamber 52 of the base 50. In the embodiment shown in FIGS. 2–4, the tubular portion 62 includes a longitudinal slot 76 in its wall, and the plunger 70 disposed in the tubular portion 62 includes a knob 78 extending to the exterior of the tubular portion 62 through the longitudinal slot 76. The cover 68 may also include a slot 82 aligned with the slot 76 of the tubular portion 62 so that the plunger 70 can be lifted into the cover 68 from the tubular portion 62 by pulling the knob 78 or a handle 84 attached to the knob 78. When the plunger 70 is in the cover 68, the cover 68 can be placed in the open position, as shown in FIG. 2, and the spring force keeps the cover 68 in the open position. After the cover 68 is placed in the open position, a coaxial stack of caps 140 can be disposed in the tubular portion 62. Then the plunger 70 is put back in the tubular portion 62 and the cover 68 is placed in the closed position, as shown in FIG. 3.

Figure 9A:
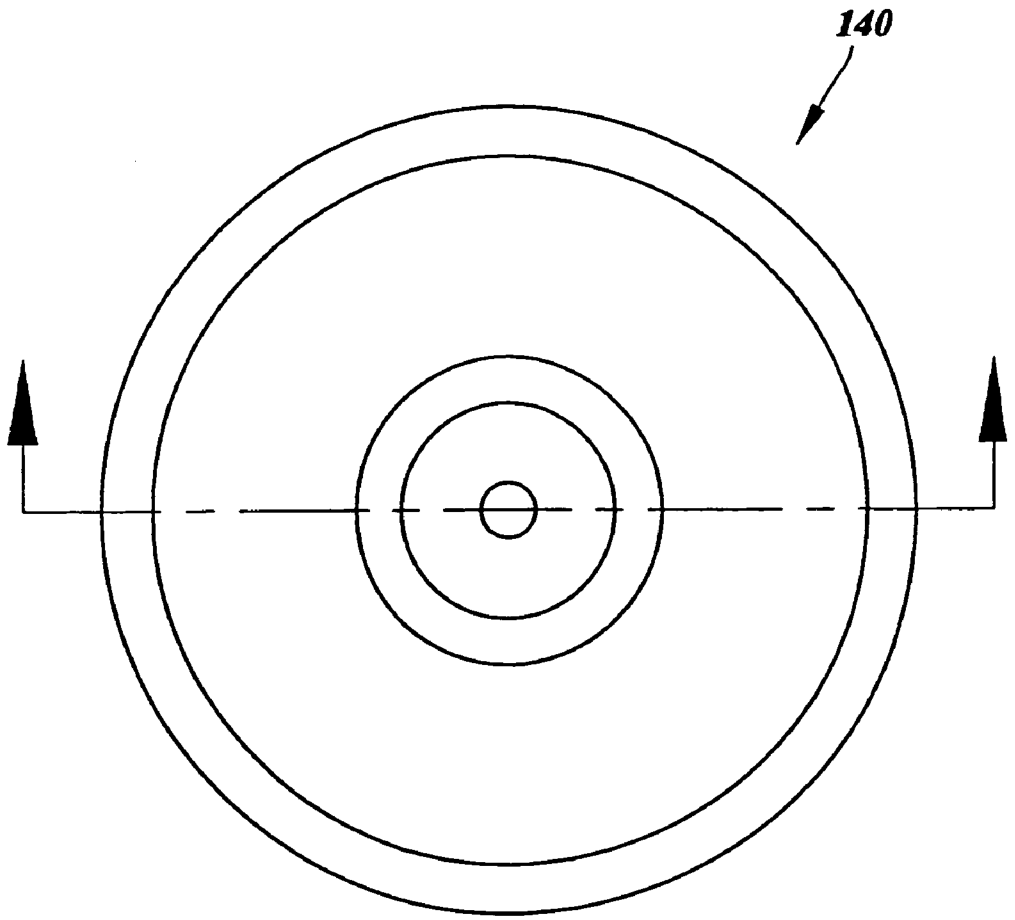
FIG. 9*a* is a top view of a cap of the present invention.
Figure 9B:
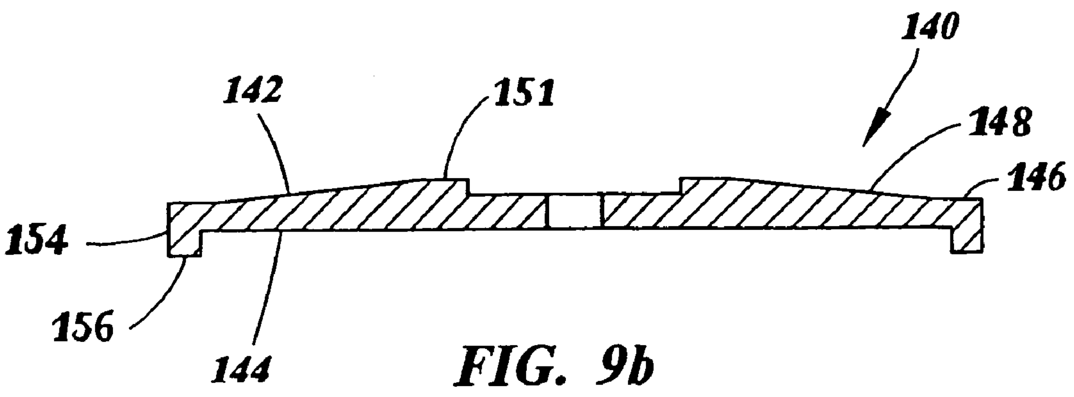
FIG. 9*b* is a cross sectional drawing of the cap shown in FIG. 9*a*.
Figure 9C:
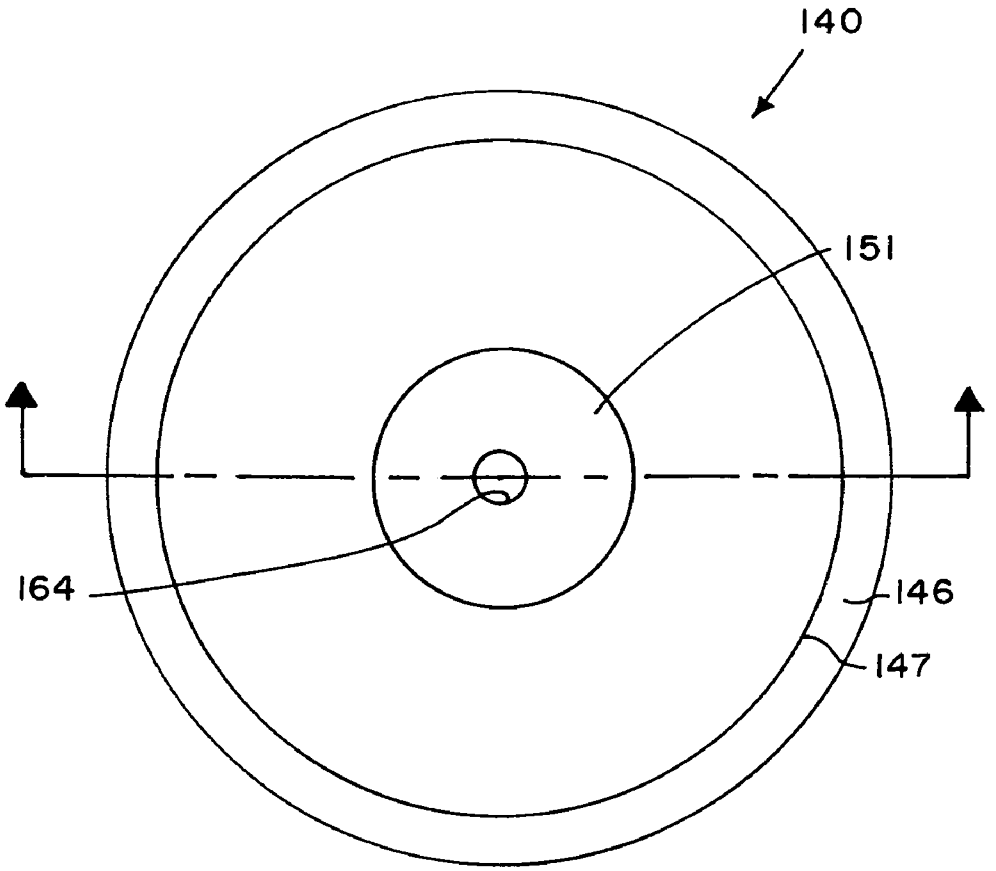
FIG. 9*c* is a top view of an alternative embodiment of the cap of the present invention.

In a preferred embodiment shown in FIGS. 9*a* and 9*b*, the caps 140 each have two opposite surfaces 142, 144 with at least one surface 142, 144 of each cap attached to a surface 142, 144 of another cap. In a preferred embodiment, the cap is circular, with a diameter of about 1 inch and a thickness of about 1/16 inch. The caps 140 can be attached to one another in several ways. For example, the caps 140 may be glued to each other, or they may be attached by friction fit. Alternatively, the stack of caps may include grooves on the opposite sides of the stack, and the caps may be held together with a string, such as a wax or plastic string, disposed on the grooves. A stack of caps 140 may include any number of caps, for example, 100 caps. A stack of caps 140 attached to each other is easier to handle and to load into the cap container 60.

The base 50 has a generally flat, elongated rectangular configuration and is used to transport caps 140 from the cap feeding chamber 52 to the cap holding chamber 54 under the nose 32 of the nail gun 20. The cap feeding and cap holding chambers 52, 54 are disposed respectively near the first and second ends 86, 88 of the base 50. The distance between the cap feeding and cap holding chambers 52, 54 is such that the cap feeding chamber 52 (and thus the cap container 60) is near the rear end 26 of the handle portion 22, and the cap holding chamber 54 is under the nose 32 of the nail gun 20. The cap feeding chamber 52 includes an indentation having a configuration similar to that of the caps 140 for accommodating a cap. In the illustrated embodiment, for example, the cap feeding chamber 52 includes an indentation having a circular configuration which is similar to the flat circular configuration of the caps 140. The cap holding chamber 54 has a generally circular through hole having a configuration similar to that of caps 140.

Figure 6:
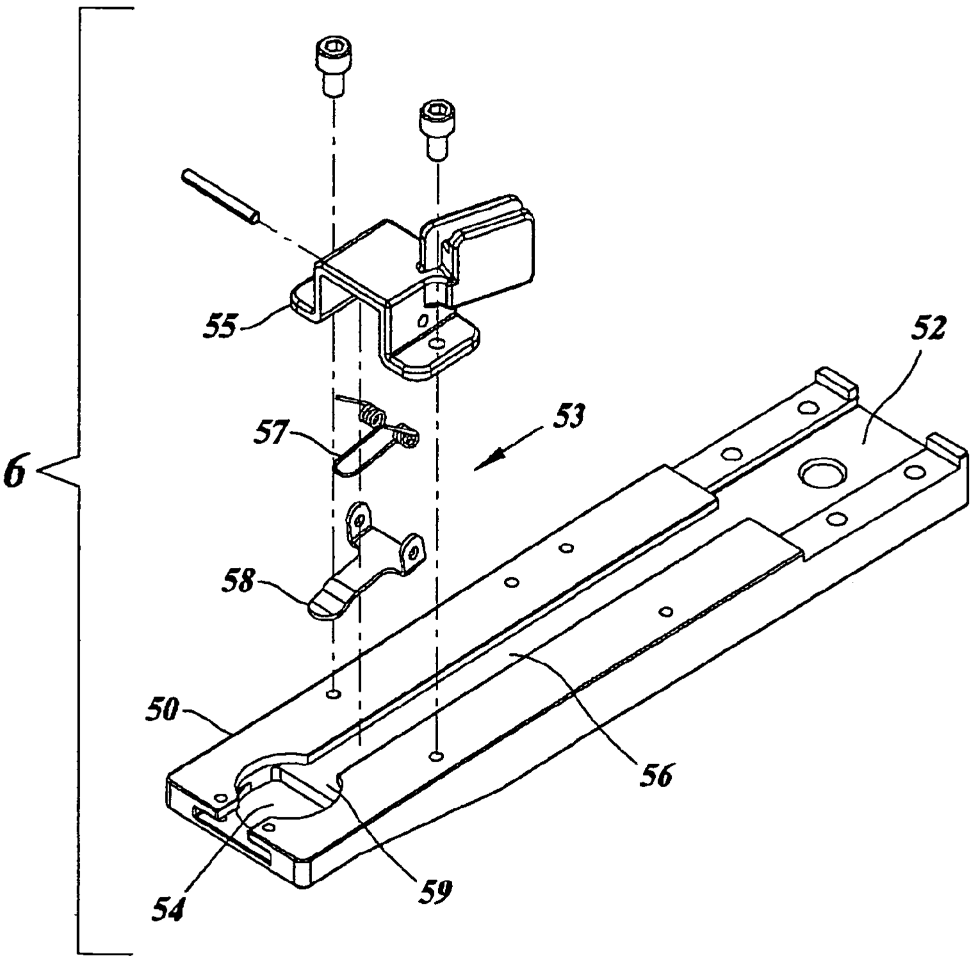
FIG. 6 is an exploded view of a mechanism for holding a cap in the cap holding chamber of the base.
Figure 7:
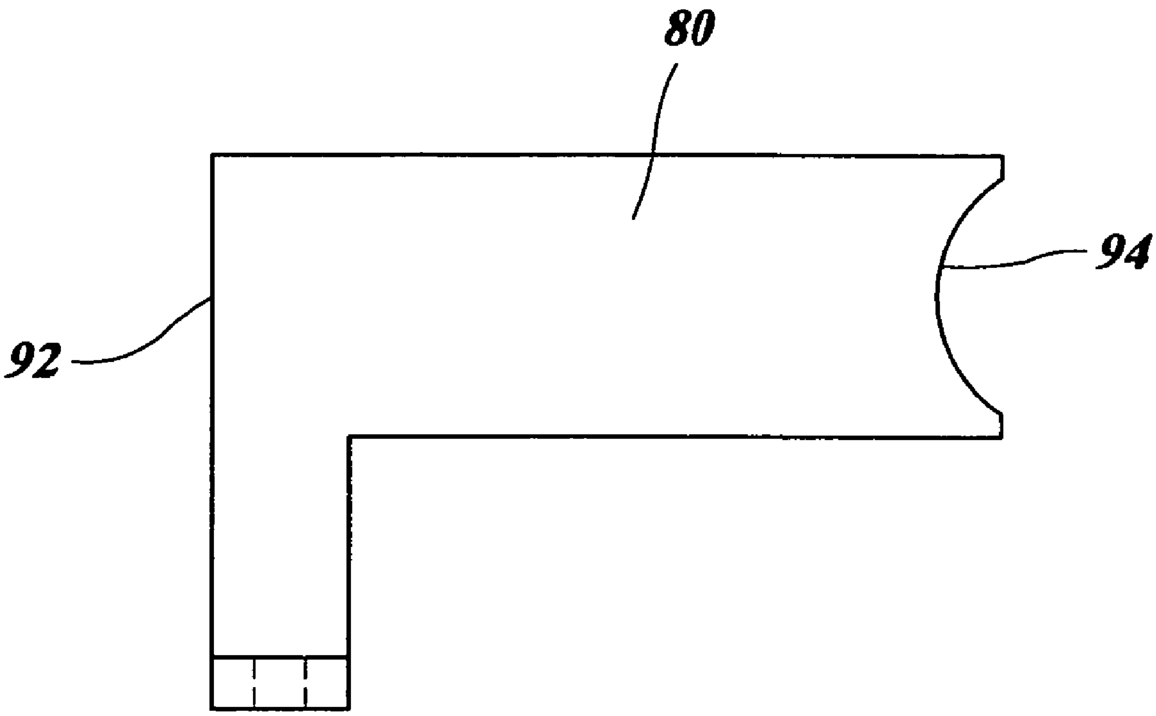
FIG. 7 is a top view of the shuttle shown in FIG. 5.

A cap holding mechanism may be provided to hold a cap in the cap holding chamber 54 and to allow a cap to go through the cap holding chamber 54 when a nail is ejected through the nose 32 of the nail gun 20 and strikes the cap. The cap holding mechanism 53 used in the illustrated embodiment is shown in FIG. 6. The cap holding mechanism 53 includes a feeding pawl 58 and a spring 57. The feeding pawl 58 and spring 57 are attached to the base 50 by a bracket 55. The spring 57 presses the feeding pawl 58 against a ledge 59 which extends from the bottom of the channel 56 into the circular cap holding chamber 54. As a cap is pushed into the cap holding chamber 54, the cap passes between the ledge 59 and the feeding pawl 58. When the cap is placed in the cap holding chamber 54, the feeding pawl 58 presses the cap against the ledge 59 and holds the cap in the cap holding chamber 54. When a nail is ejected through the nose 32 of the nail gun 20 and strikes the cap, the feeding pawl 58 releases the cap and allows the cap to go through the cap holding chamber 54.

The channel 56 extends between the cap feeding chamber 52 and the cap holding chamber 54. At the cap feeding chamber 52, the channel 56 extends beyond the cap feeding chamber 52 and intersects the first end surface 86 of the base 50 to form an opening 90. Preferably, the bottom surface of the cap feeding chamber 52 is flush with the bottom surface of the channel 56 so that a cap disposed in the cap feeding chamber 52 can be pushed into the channel 56 towards the cap holding chamber 54. At the cap holding chamber 54, the channel 56 does not extend beyond the cap holding chamber 54 so that a cap can only be fed to the cap holding chamber 54 from the channel 56 but not beyond cap holding chamber 54. The channel 56 has a cross section similar to the cross section of the caps 140. For example, the channel 56 in the illustrated embodiment has a rectangular cross section with its width similar to the diameter of the caps 140 and with its height similar to the height of the caps 140. In this way, only one cap can be pushed into the channel 56 from the cap feeding chamber 52, and the channel 56 can accommodate only one cap at any particular position.

As illustrated in FIGS. 4, 5, 7 and 8, the shuttle 80 has a generally flat rectangular configuration. At least a portion of the shuttle 80 is movably disposed in the channel 56 of the base 50 through the opening 90 of the channel 56. The rest of the shuttle 80 may be outside of the channel 56 or may also be disposed in the channel 56. Preferably, the cross section of the shuttle 80 is similar to or slightly smaller than that of the caps 140 and that of the channel 56. Preferably, the cross section of the shuttle 80 is similar to or slightly smaller than that of the caps 140 and that of the channel 56. In the illustrated embodiment, the first end 92 of the shuttle 80 is outside of the channel 56 while the second end of the shuttle 80 is disposed in the channel 56. The shuttle 80 is movable within the channel 56 between a forward position and a back position. At the forward position, the second end 94 of the shuttle 80 is between the cap feeding chamber 52 and the cap holding chamber 54. At the back position, the second end 94 is between the cap feeding chamber 52 and the opening 90 of the channel 56. When the shuttle 80 moves from the back position to the forward position, the second end 94 of the shuttle 80 pushes a cap in the cap feeding chamber 52 towards the cap holding chamber 54 by a distance substantially equal to the diameter of each of the caps 140. Preferably, the second end 94 of the shuttle 80 has a semicircular configuration that conforms to the side surface of each of the caps 140.

Figure 5:
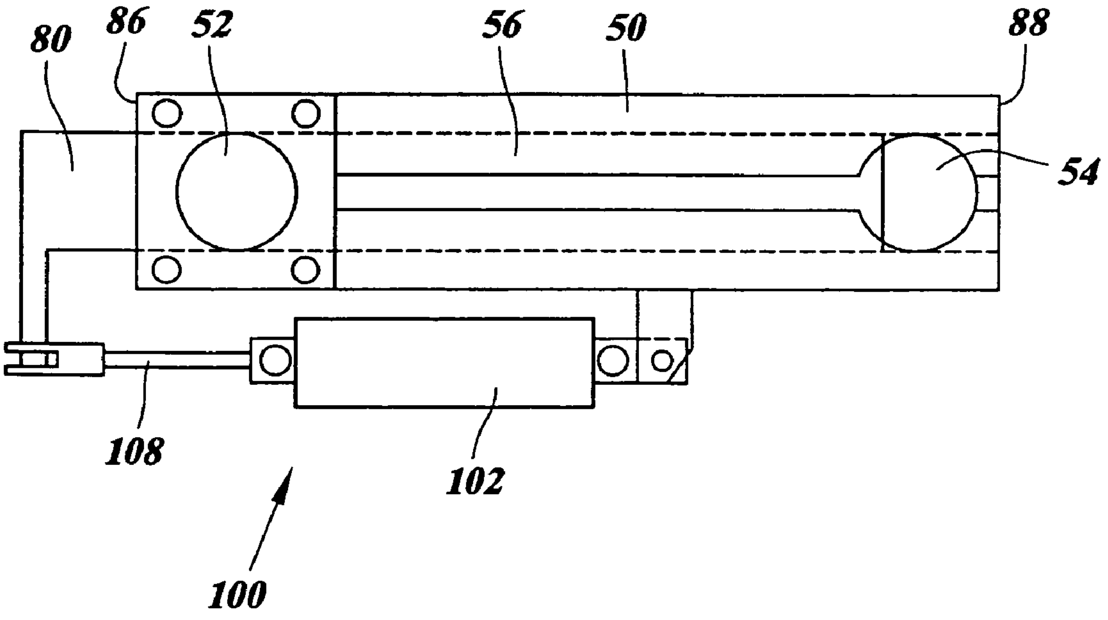
FIG. 5 is a top view of a base, a shuttle and a piston-cylinder arrangement of the embodiment shown in FIG. 1.
Figure 8:
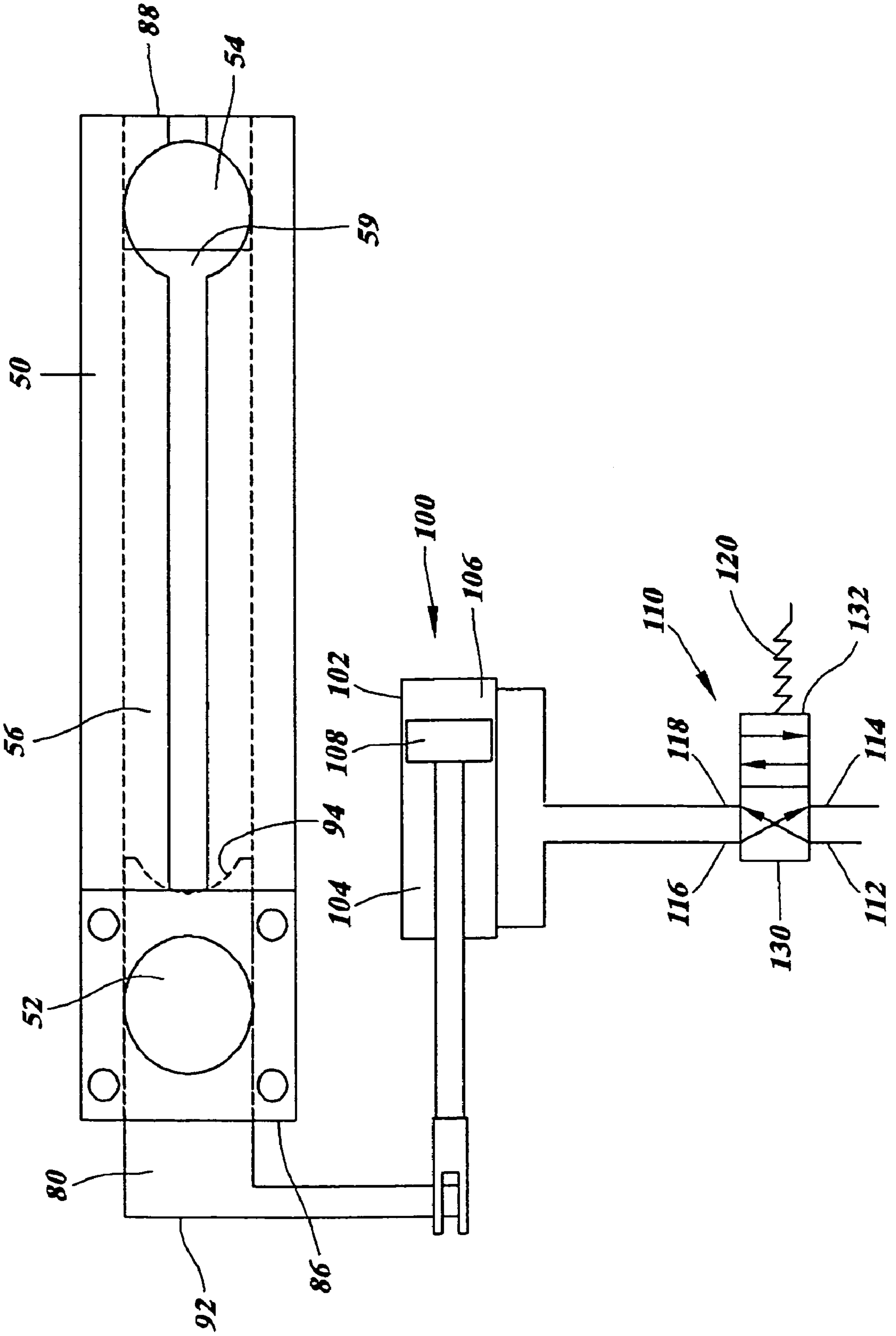
FIG. 8 is a schematic drawing of the system controlling the movement of the shuttle.

As shown in FIGS. 1, 5 and 8, a piston-cylinder arrangement 100, powered by compressed air, is connected to that portion of the shuttle 80 outside of the channel 56 (or any portion of the shuttle 80) to move the shuttle 80 in the channel 56. Alternatively, any linear or rotational actuator, such as an electric or hydraulic motor, may be used to move the shuttle 80 in a desired manner. Although not shown in the Figures, a shield or guard may be provided to cover the moving piston and/or the first end 92 of the shuttle 80 to protect the operator from injury. The cylinder 102 includes a forward chamber 104 and a back chamber 106, which are separated by the piston 108. Compressed air can be supplied either to the forward chamber 104 or to the back chamber 106 to move the piston 108 within the cylinder 102. The supply of compressed air to the chambers 104, 106 of the cylinder 102 is controlled by a four-way, two-position valve 110, as shown in FIG. 8. Compressed air can be supplied to the cylinder 102 from the nail gun 20 or from another source.

The positioning of the valve 110, thus the movement of the piston 108 and the shuttle 80, is coordinated with the relative movement of the nail gun 20 and the cap feeding device 40. The nail gun 20 and the cap feeding device 40 are pivotably attached to each other at a joint 150. A spring 120 disposed between and connected to the nail gun 20 and the cap feeding device 40 normally biases the cap feeding device 40 and the nail gun 20 against each other and keeps the nose portion 32 of the nail gun 20 apart from the cap holding chamber 54 of the base 50. When the base 50 is placed on a roof surface and the nail gun 20 is pressed towards the base 50, the spring 120 is compressed, allowing the nose portion 32 to be positioned just above the cap holding chamber 54. In this position, the nail gun 20 can be triggered to expel a nail through the opening 34 of the nose 32.

The coordination between the movement of the shuttle 80 and the relative movement between the nail gun 20 and the cap feeding device 40 can be explained while referring to the schematic drawing in FIG. 8. The four-way, two-position valve 110 includes an air pressure port 112, an exhaust port 114, and forward and back ports 116, 118 connected respectively to the forward and back chambers 104, 106 of the cylinder 102. At the first valve position 130, the pressure port 112 is connected to the back port 118, and the exhaust port 114 is connected to the forward port 116. Compressed air is supplied to the back chamber 106 of the cylinder 102, and the forward chamber 104 is connected to the exhaust port 114. At the second valve position 132, compressed air is supplied to the forward chamber 104, and the back chamber 106 is connected to the exhaust port 114. Normally, the nail gun 20 and the cap feeding device 40 are kept apart by the spring 120, and the valve 110 is in the first position. At this position, compressed air is supplied to the back chamber 106, and the shuttle 80 is in the back position. When the nail gun 20 is pressed towards the base 50 of the cap feeding device 40, the spring 120 is compressed, and the spring 120 pushes the valve 110 into the second position 132. At this position, compressed air is supplied to the forward chamber 104 and the shuttle 80 is moved to the forward position.

The operation of the nail gun assembly 10, which includes the cap feeding device 40, can be described while referring to FIGS. 1–8. If the cap container 60 is empty at the beginning of the operation, the plunger 70 can be lifted into the cover 68, and the cover 68 can be placed in the open position. A stack of caps 140 attached to one another is disposed in the cap container 60. The plunger 70 then is put back into the container 60, and the cover 68 is placed in the closed position. If there are no caps in the channel 56 of the base 50 at this time, caps 140 can be fed into the channel 56. To do so, the nail gun assembly 10 is placed on a surface such as a roof surface, and the nail gun 20 is pressed towards the base 50 to compress the spring 120. The spring 120 then presses the valve 110 to put the valve 110 in the second valve position, and compressed air is supplied to the forward chamber 104 of the cylinder 102 and pushes the piston 108 to the forward position. The shuttle 80 is pushed to the forward position by the piston 108, and the shuttle 80 pushes the cap in the cap feeding chamber 52 towards the cap holding chamber 54 by a distance equal to the diameter of one of the caps 140. When the nail gun assembly 10 is lifted off the roof surface, the spring 120 pushes the nail gun 20 and the cap feeding device 40 apart, and the valve 110 returns to the first valve position. The shuttle 80 is moved back to the back position and a cap is fed into the cap feeding chamber 52. This is repeated until the channel 56 is full of caps but a cap is not yet fed into the cap holding chamber 54. While doing this, the nail gun 20 need not be triggered to discharge a nail each time a cap is advanced in the channel 56. After a cap is loaded into the cap holding chamber 54, the nail gun assembly 10 is ready for use. The nail gun assembly 10 can then be placed on a piece of roof material, such as a piece of tarpaper, placed over a roof surface. The nail gun 20 is pressed towards the base 50. The shuttle 80 moves to the forward position and pushes the cap in the cap feeding chamber 52 towards the cap holding chamber 54 by a distance equal to the diameter of the cap 140. Also, the cap next to the cap holding chamber 54 is pushed into the cap holding chamber 54. Then, the nail gun 20 is triggered to eject a nail through the opening 34 on the nose 32. The nail penetrates the cap in the cap holding chamber 54 and the tarpaper, and protrudes into the roof structure. The tarpaper is attached to the roof surface by the nail with a cap disposed between the tarpaper and the head of the nail. When the nail gun assembly 10 is lifted off the roof surface, the shuttle 80 moves back to the back position, and a cap is fed into the cap feeding chamber 52. Then, the nail gun assembly 10 is again ready for use.

Referring now to FIGS. 9*a* through 9*h*, the preferred embodiments of caps 140 are illustrated. As illustrated in FIGS. 2–4, caps 140 are stored in cap container 60 to be singularly forwarded by cap feeding device 40 for installation. Caps according to the present invention have a configuration which facilitates the separation of an individual cap 140 from a stack and the feeding through the cap feeding mechanism 40 to ensure uniform supply of caps 140 and reliable operation of staple gun 20. Upper surface 142 of cap 140 includes a margin 146 disposed around the periphery of cap 140. Inwardly of margin 146 is a conical section 148 which slopes upwardly from the rim toward a top plateau 151 of the cap 140 at angle $\alpha$ of preferably about 20 degrees from the horizontal plane of cap 140, although angles of from about 10 degrees to about 30 degrees are operable. The periphery of cap 140 is defined by a side wall 154 and a bottom wall 156. Internally of bottom wall 156 is interior vertical wall 158 which terminates at a conical section 160 forming generally the undersurface of cap 140, conical section 160 proceeds centrally to a bottom plateau 162 essentially parallel to top plateau 151 forming the remainder of the interior relatively concave surface of washer 140. In the illustrated embodiment of FIGS. 9*c* and 9*d*, a hole 164 is centrally located between top plateau 151 and bottom plateau 162. The function of hole 164 will be subsequently described. Walls 154, 156 and 158 define a peripheral rim 168 being a circular band, the function of which will be subsequently described.

Figure 9D:
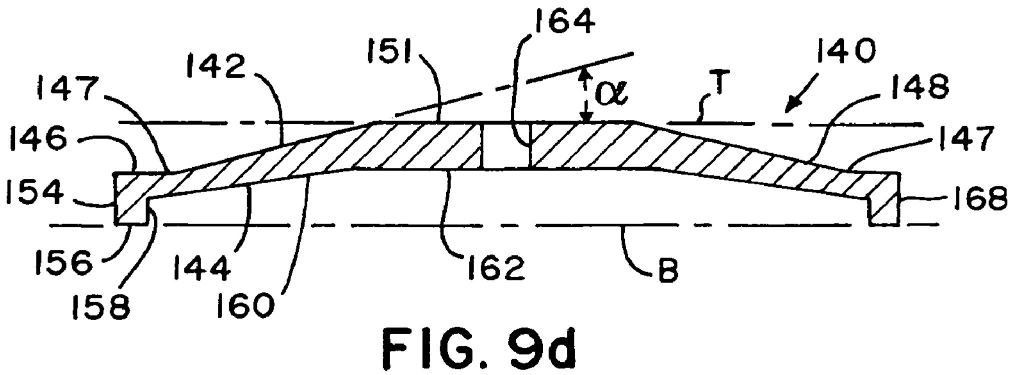
FIG. 9*d* is a cross sectional drawing of the cap shown in FIG. 9*c*.

Roofing washer 140 illustrated in varying preferred embodiments in FIGS. 9*a* through 9*h* is specially adapted to be loaded into a magazine 60 for a roof nailing machine as is illustrated in the present invention. The inventive washer embodies several features which facilitate its being prepackaged in a stack of a convenient number, such as 100 caps for loading in such as magazine 60 to be singly fed through cap feeding device 40 in a reliable sequential manner providing the user of staple or nail gun assembly 10 an uninterrupted supply of caps 140 so long as there remain caps in magazine 60. Special features of cap 140 which enable the exemplary service of the present invention are the lower peripheral rim 168 which is formed by side wall 154, bottom wall 156 and interior wall 158. Peripheral rim 168 provides stability to a stack of caps 140 such as illustrated in FIG. 3 and facilitates the individual feeding of the caps 140 by shuttle 80 as illustrated generally in FIGS. 3–6 and additionally subsequently described. As previously stated, caps 140 are preferably about one inch in diameter and exhibit a general thickness of approximately 1/16th inch and composed of a plastic material well known in the art for such purposes. However, the vertical extent of cap 140 with the domed and rimed construction stands approximately 1/8 inch above baseline B to top line T, because of the downwardly extending rim 168 and the conical dome formed by conical section 148 and top plateau 151. Upper surface 142 of cap 140 is composed of margin 146 which extends horizontally from side wall 154 toward the center of cap 140, a distance preferably at least twice the thickness of rim 168, which in the illustrated embodiment is approximately 1/16 inch in thickness. Margin 146 provides the resting surface for a cap stacked immediately above it as is illustrated in FIG. 10. Accordingly, margin 146 extends roughly 1/8th inch radially inwardly of side wall 154 to form a junction 147 and meets conical surface 148. As is illustrated in FIG. 9*d*, conical surface 148 extends upwardly to top plateau 151 which describes a circular area of approximately 3/8 inch in diameter thereby forming a truncated cone. Correspondingly, the lower cap surface is preferably defined by conical section 160 which extends upwardly and inwardly from side wall 158 to a generally circular bottom plateau. In the illustrated embodiment, the diameter of bottom plateau 162 is approximately 7/16th inch. In the embodiment illustrated, it should be noted that the relative thickness of cap 140 adjacent junction 147 is less than elsewhere in cap 140.

FIG. 10 illustrates the relationship of adjacent caps when stacked illustrating that upon stacking, bottom rim 168" of upper cap 140" provides spacing from the lower cap 140' such that the top plateau of bottom cap 140' is disposed adjacent and touching the bottom plateau 162" of upper cap 140 as the rim 168" of cap 140" rests firmly on the margin 146' of lower cap 140'. In such arrangement, the stack of caps 140 provide a stable vertical orientation so as to be conveniently packaged in a vertical stack of caps of a convenient number such as 100, the packaging of such a stack of caps being subsequently described.

Figure 11:
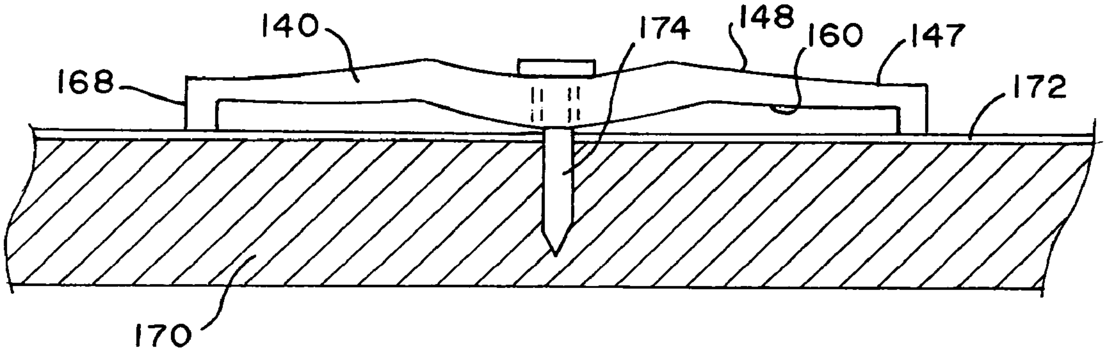
FIG. 11 is an elevational view, partially in section of the cap shown in FIG. 9*d* installed on a roof deck.

FIG. 11 illustrates the superior holding capacity of cap 140 when disposed on a roof surface 170 holding a layer of felt roofing paper 172 by means of nail 174. It will be seen that the entry of nail into the roof surface 170 draws the top and bottom plateaus of cap 140 downwardly toward roof surface 170 such that bottom plateau 162 engages roof felt 172 holding it firmly against roof surface 170. Concurrently as the general conical surfaces 148 and 160 are drawn downwardly by nail 174, the peripheral rim 168 also engages roofing felt 172 firmly because of the resilient nature of cap material 140. Accordingly, with cap 140 in position as illustrated in FIG. 11, a secure holding of roofing felt 172 is accomplished on the roof surface 170. Cap 140 and nail may also be utilized to secure other building materials such as polyethylene or Styrofoam sheeting.

Figure 12:
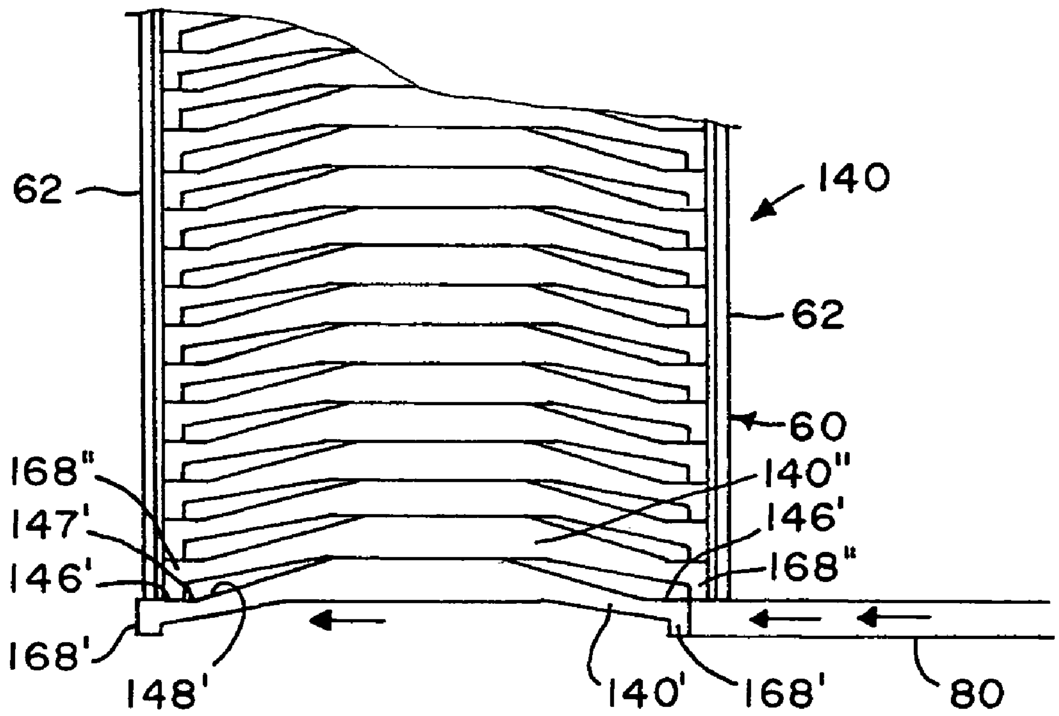
FIG. 12 is a partial sectional elevational view of a stack of caps being fed according to the present invention.

Referring now to FIG. 12, the function of the cooperating surfaces of cap 140 as a cap is urged off of the bottom of the stack of caps 140 by shuttle 80 will now be explained. As shuttle 80 advances as indicated in the arrows, it feeds cap 140' laterally such that the rim 168" of the cap 140" immediately above cap 140' slides along margin 146'. As may be seen in FIG. 12, the stack of caps 140 being contained within the tubular member 62 of container 60, rim 168' of cap 140' clears the extent of tubular member 62 in a lateral direction before the rim 168" of cap 140" reaches the innermost extent of margin 146'. The relative dimensions of the various mentioned structural features of caps 140 enable the cap 140' being fed to clear the tubular member 62 in respect of rim 168' before rim 168" slides up in the upper conical section 148' during the feeding process. By allowing leading edge of cap 140' to clear tubular member 62 prior to the stack of remaining caps 140 within tube 62 having to accommodate the upper conical section 148, a smooth feeding transition and sliding of the remaining caps through the upper cap 140" is accomplished. This combination of relative movement of rim 168 on margin 146 and the conical surfaces 148 avoids disjointed surfaces to enable the reliable consistent feeding of caps 140 by shuttle 80.

Figure 13:
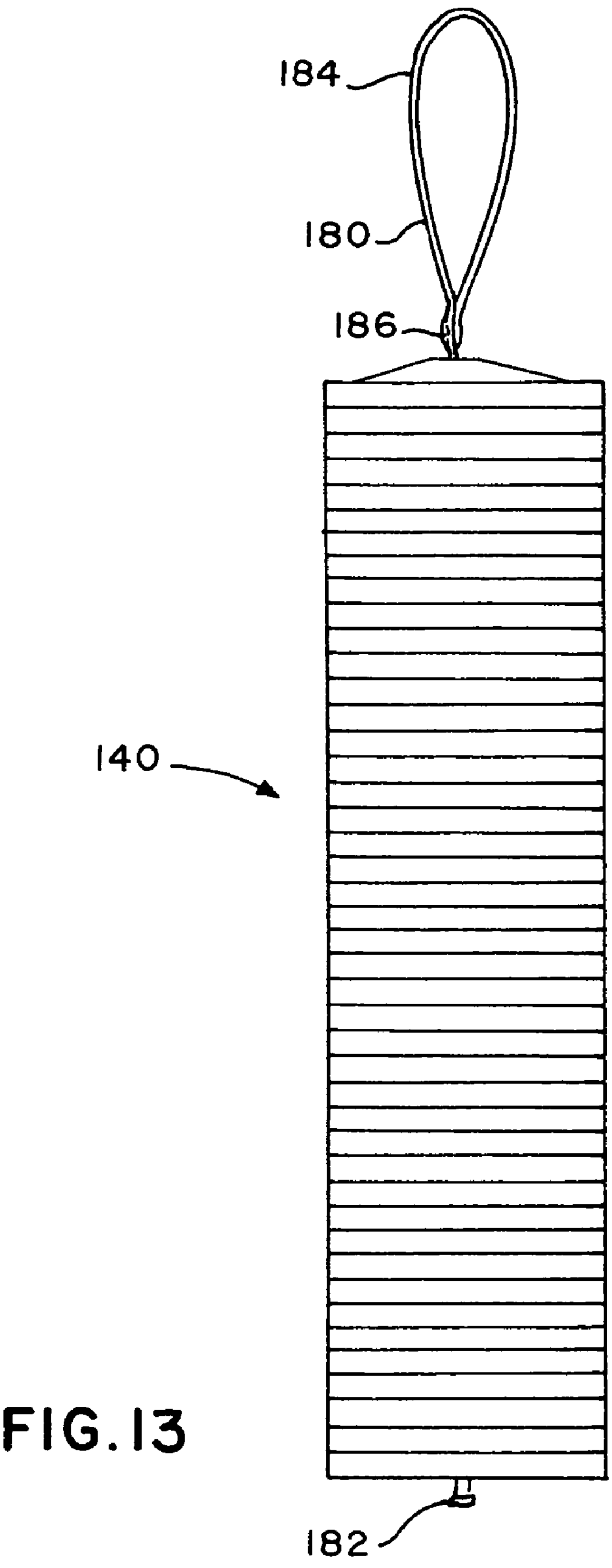
FIG. 13 is an elevational view of a stack of caps according to the present invention.
Figure 14:
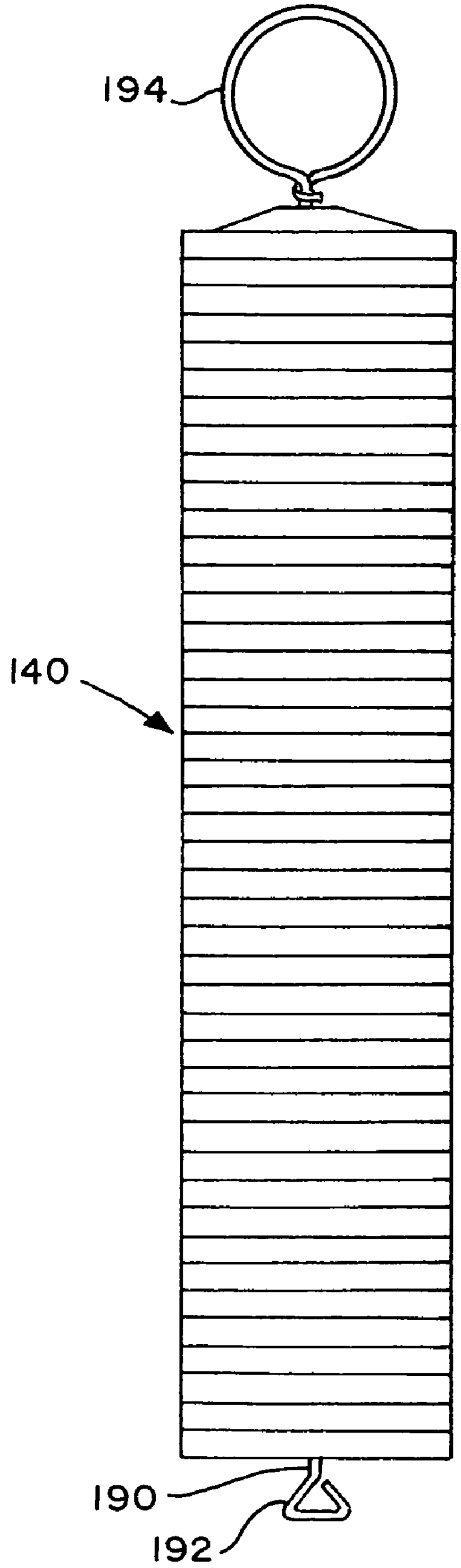
FIG. 14 is an elevational view of an alternative embodiment of a stack of caps according to the present invention.

Because of the various previously mentioned surface features of caps 140 enable a smooth, consistent, reliable feeding of a bottom cap in a stack through a feeding shuttle 80 as illustrated, caps may be conveniently stacked through several inventive means. Cap 140 illustrated in FIG. 9*c* containing hole 164 may be stacked and bound in a convenient package by such as a line or wire traversing the stack of caps 140 as illustrated in FIGS. 13 and 14. In FIG. 13 caps 140 are held together with a thermoplastic cord 180 such as is utilized in plastic rotary lawn trimmers, i.e., of the type sold under the trademark "Weed Eater" owned by Aktiebolaget Electrolux. A plastic cord of a thickness of 0.050 to 0.065 inches in thickness are conveniently utilized. Such plastic cord is available in hardware suppliers in such sizes. A suitable length of plastic cord 180 is fed through the stack of caps 140 to a degree where it exits the bottom of the stack of caps 140. A knob or knot of material may be formed as at 182 at the lower reach of the stack of caps 140 to retain the caps on the plastic cord. Preferably the cord may be touched as with a hot iron to melt the thermoplastic cord 180 to form an enlarged portion or knob as at 182, the enlarged portion having a diameter slightly larger than hole 164. The stack of caps are thus securely retained on cord 180. The cord may be conveniently terminated at the top of its extent by a convenient loop 184 as illustrated in FIG. 13. The loop again may be formed as by tying or melting of the thermoplastic cord, as at region 186 as illustrated. When the caps are thus installed into container 60 of nailing machine 10, the cap is directed into tube 62 and the top of the caps are pressed lightly off of the cord 180 into or towards the bottom of tube 62 which is then closed as described previously.

FIG. 14 describes an alternative similar embodiment wherein the stack of caps 140 are held together with a metal wire in a manner similar to plastic cord in FIG. 13. The wire is fed through the hole 164 of the stack tack of caps until it exists the bottom cap of stack of caps 140. A retainer may conveniently be formed at the bottom end of wire 190, may be terminated as at 192 by creasing the metal wire into such as a triangular shape as illustrated. Caps 140 are thus securely retained on wire 190 until such time as inserted into tubular member 62 in a manner as previously described. Wire 190 is conveniently terminated at the upper portion of the stack as by twisting or tying the wire forming a loop 194.

Figure 15:
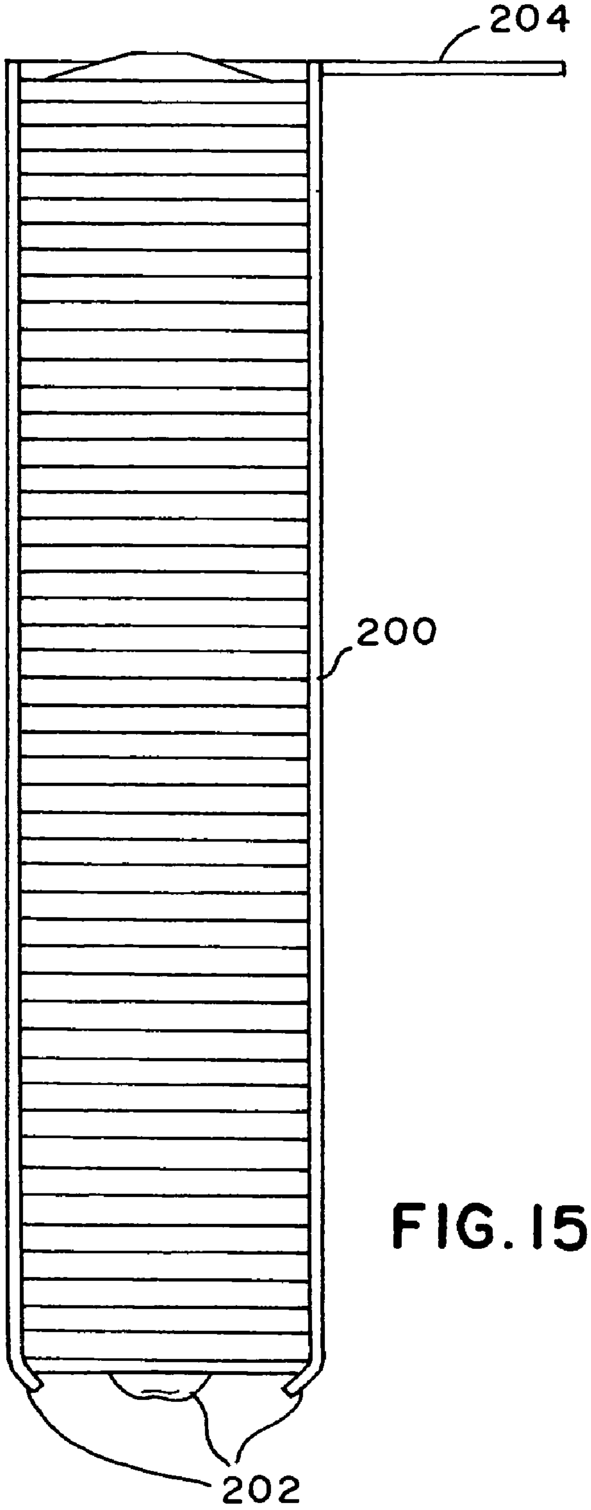
FIG. 15 is an elevational view of an alternative embodiment of a stack of caps according to the present invention.
Figure 16:
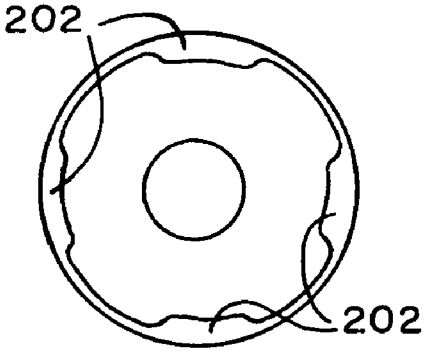
FIG. 16 is a bottom view of the stack of caps shown in FIG. 15.
Figure 21:
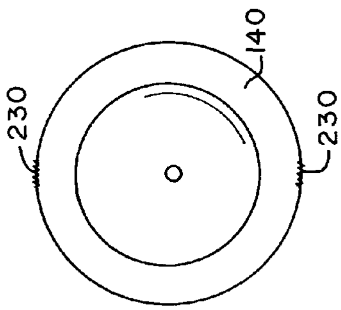
FIGS. 20–24 show a fifth alternative embodiment of assembling a stack of caps according to the present invention.

A third alternative of assembling a stack of caps is illustrated in FIGS. 15 and 16 by means of a cylindrical plastic tube 200 having a diameter just slightly larger than the diameter of caps 140. Tube 200 is terminated at its lower end with such as flanges 202 to catch and retain caps 140 when inserted and stacked into tube 200. The upper end of tube 200 may be terminated with a handle 204 such as illustrated or alternatively by a circular flange or the like similar to that illustrated in the lower portion of FIGS. 15 and 16, or in continuous circular flange. For added security, an adhesive label may be added over the top portion of tube 200 to ensure retention of the caps therein. On insertion of tube 200 into tube 62, tube 200 is withdrawn while maintaining pressure with stack of caps 140 such that flanges 202 are deformed to release caps 140.

Figure 9E:
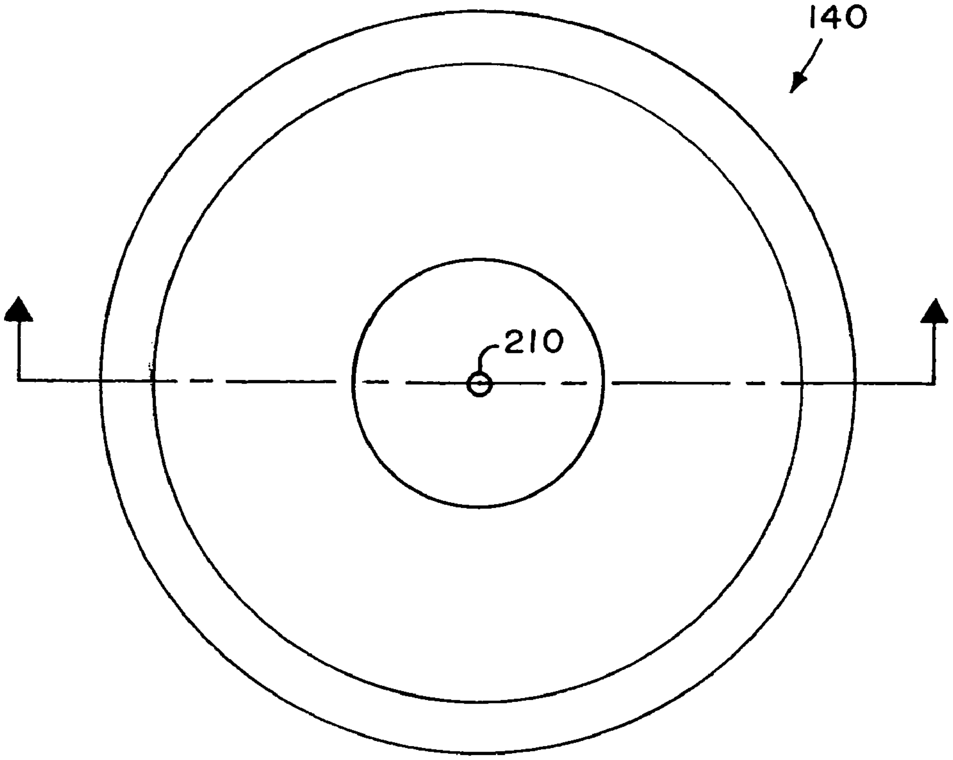
FIG. 9*e* is a top view of an alternative embodiment of the cap of the present invention.
Figure 9F:
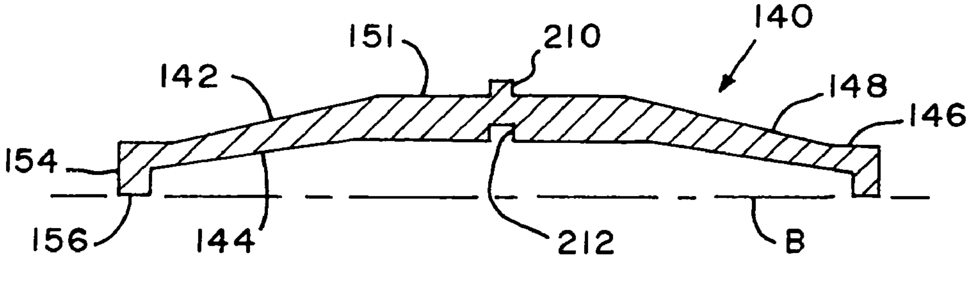
FIG. 9*f* is a cross sectional drawing of the cap shown in FIG. 9*e*.
Figure 10:
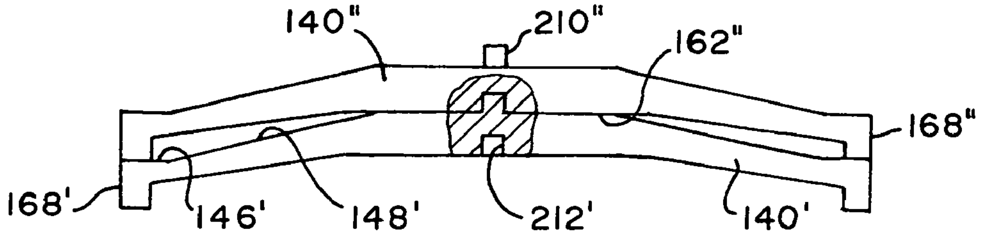
FIG. 10 is an elevational view, partially in section of the cap shown in FIG. 9*f*.

FIGS. 9*e* and 9*f* and FIG. 10 illustrate an alternative style of cap which may be stacked and retained in a stack without independent means as illustrated in FIGS. 13 through 16. Cap 140 in FIGS. 9*e* and 9*f* include a small stud 210 disposed on the top plateau 151 of cap 140. Stud 210 is centrally located on the top plateau 151 and in the illustrated embodiment is approximately 0.04 inches in diameter and extends upwardly from top plateau 151 in an amount approximately 0.40 inches. Bottom plateau 162 is adapted with a cooperating hole 212 into which stud 210 will be received when caps 140 are assembled in stacked relationship. Hole 212 in the illustrated embodiment is of a diameter slightly smaller than stud 210 being approximately 0.035 inches in diameter and the hole extends slightly greater depth than the height of stud 210 which in the illustrated embodiment is approximately 0.045 inches. Those skilled in the art will appreciate that the thickness and height of the described studs and cooperating hole may be varied in dimension without departing from the scope and spirit of the invention. Likewise, rather than a single centrally located stud and hole, other patterns might be selected with similarly suitable results such as offset pairs of triangularly or other locations about the center of top plateau 151.

Figure 9G:
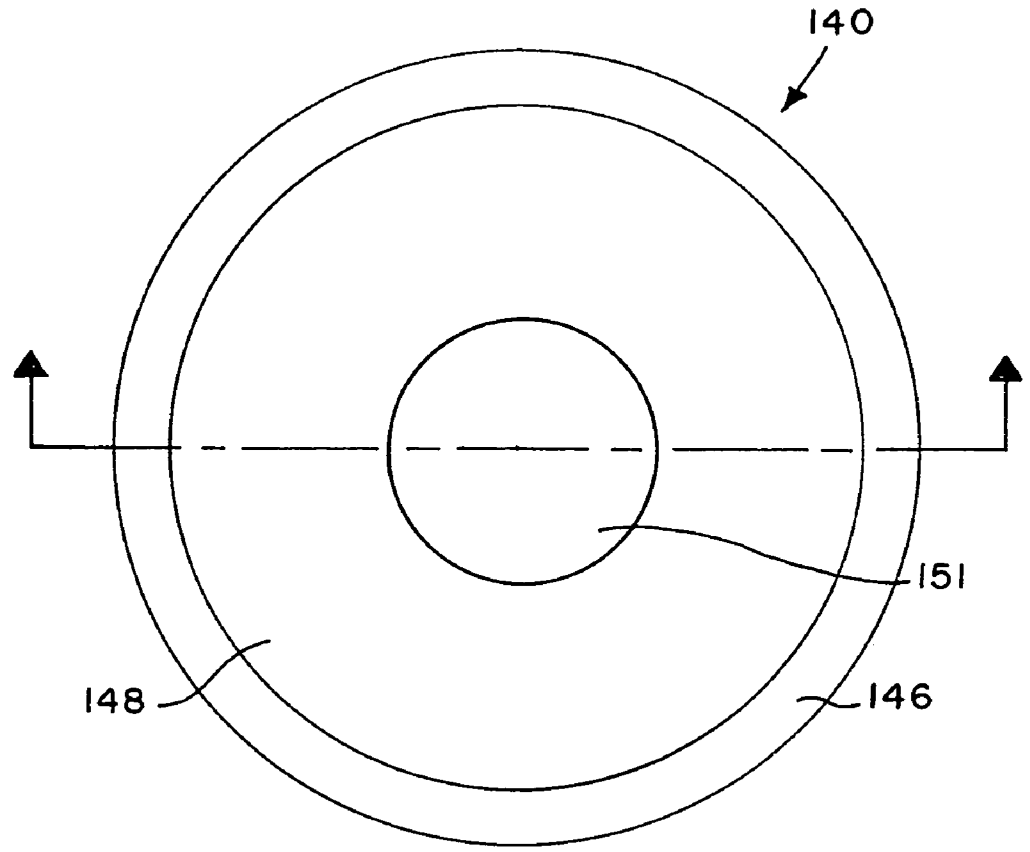
FIG. 9*g* is a top view of an alternative embodiment of the cap of the present invention.
Figure 9H:
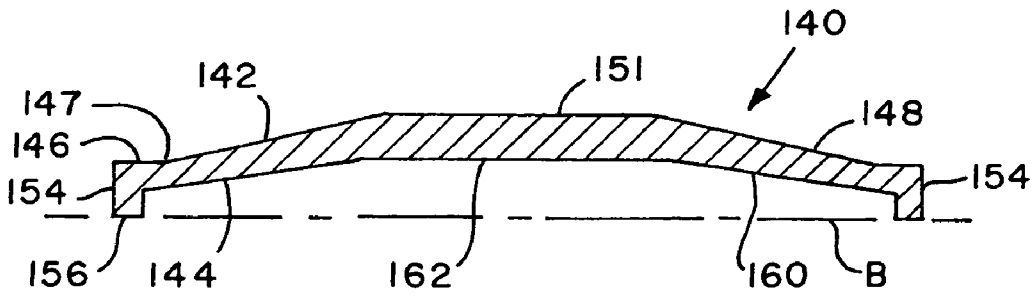
FIG. 9*h* is a cross sectional drawing of the cap shown in FIG. 9*g*.

FIGS. 9*g* and 9*h* illustrate further embodiment of caps 140 wherein the region between top plateau 151 and bottom plateau 162 is solid. Stacks of caps 140 may be formed in stacked relationship with such as the illustrated cap by means of a nominal amount of adhesive such as a drop of hot melt adhesive placed on the top or bottom plateau during a stacking operation whereby once the adhesive has cooled, the caps are retained in stacked relation. Other adhesives may likewise be employed with the limiting factor being that the sheer strength of the adhesive when applied to the caps shouldn't exceed the material strength of the caps such that the top plateau 151 and bottom plateau 162 are sheared or otherwise disfigured during the feeding operation. Deterioration of the top plateau 151 could result in irregular feeding of the caps.

Figure 18:
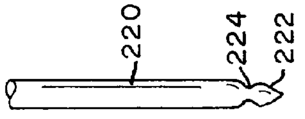
FIGS. 17–19 show a fourth alternative embodiment of assembling a stack of caps according to the present invention.
Figure 19:
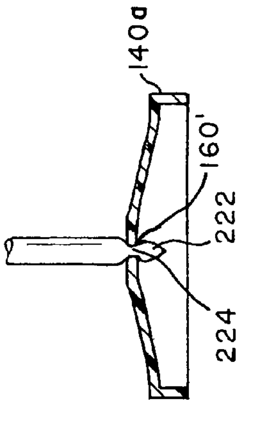
Figure 17:
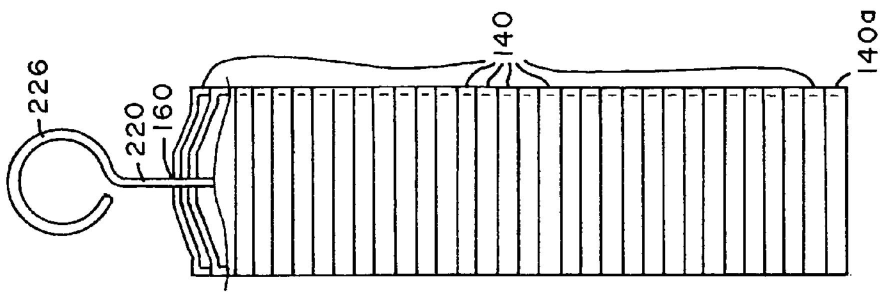
Figure 24:
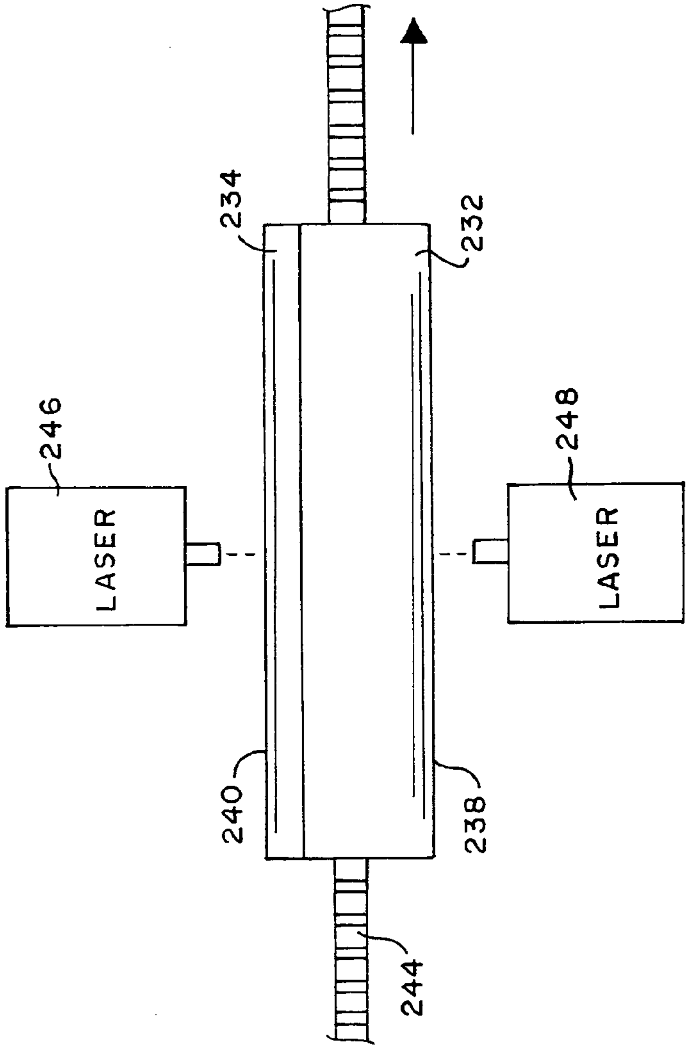

FIGS. 17–19 show a fourth alternative embodiment of assembling a stack of caps according to the present invention. A rigid retaining rod 220 or skewer passes axially through the caps 140, 140*a*, which are preferably like those shown in FIGS. 9*c* and 9*d*, heretofore discussed in detail. Caps 140 have a first diameter axial hole 160 similarly-sized as the axial diameter of rod 220 so that rod 220 can be slid through the aligned axial holes 160 of the stacked caps 140. The tip 222 of rod 220 has a reduced-diameter neck 224 that is frictionally received into the reduced-diameter axial hole 160' of the bottom-most cap 140*a* as the tip 222, having a larger diameter than reduced-diameter neck 224, is piercingly inserted through the reduced-diameter hole 160' of the bottom-most cap 140*a*. The resilience of bottom-most cap 140*a* causes the bottom-most cap 140*a* to be retained about the reduced-diameter neck 224 of rod 220 as the hole 160' constricts about neck 224 after tip 222 has passed therethrough, thereby holding the stack of caps 140, 140*a* on the rod 220 until they are to be used.

Rod 220 further has a grasping loop portion 226. To use this fourth alternative embodiment, the stacked assembly of caps is lowered into the feeding tower or container of a cap gun. The user then grasps the portion 226 while holding the stacked assembly of caps within the cap gun as by using a finger or thumb, and the user then pulls the rod 220 from the stacked assembly of caps, thereby causing the tip 222 and reduced-diameter neck 224 to become disengaged from bottom cap 140*a* as the entire rod is withdrawn from the stacked assembly of caps, which are left in the gun for subsequent dispensing and nailing by the gun.

The use of a rigid retaining rod 220 as shown in FIGS. 17–19 has an advantage over the use of thermoplastic cord as disclosed for the embodiment of FIG. 13, namely, that it is much easier to feed a rigid rod down through the caps during manufacture of the stacked assembly of caps than it is to feed a thermoplastic cord through the stacked assembly, thereby permitting faster assembly of the stacked caps. Additionally, during loading of the cap gun, the rigid rod holds the stacked assembly of caps more perfectly axially aligned because of the rigidity of rod 220 as compared to the flexibility of thermoplastic cord, thereby facilitating the gun loading process and reducing loading time. If desired, the reduced-diameter neck 224 may be formed by cutting a circumferential groove around the end of rod 220 adjacent the pointed tip 222.

FIGS. 20–24 show a fifth alternative embodiment of assembling a stack of caps according to the present invention. In this embodiment, the stacked assembly of caps 140 are held together by adjacent caps 140 being melted together at one or more places. Preferably the caps are melted together as by heating means such as a flame, a laser, hot air, or a heating element such as a soldering iron, preferably by having one or more melted portions 230 that run longitudinally along the circumferences of the stacked caps 140. The caps 140, being made of plastic material, melt when heated along melted portions 230, thereby causing adjacent caps 140 to be meltingly held together.

Figure 22:
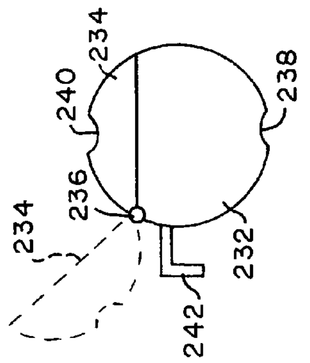
Figure 20:
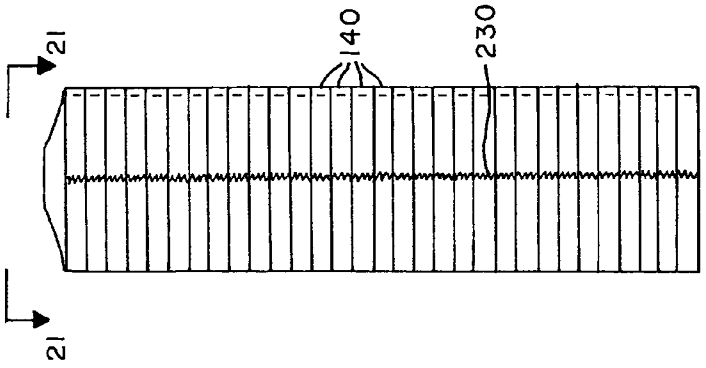
Figure 23:
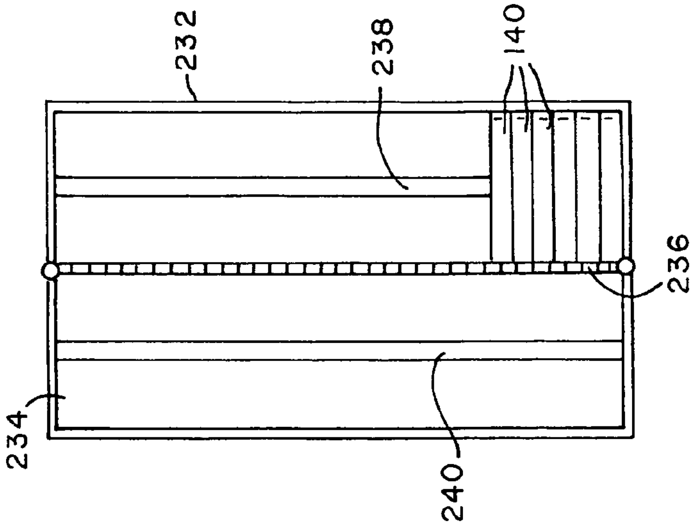

To create this stacked assembly of caps 140, the caps are preferably stacked within a sled 232 having a hinged lid 234 that opens for loading as shown in FIG. 23 and as shown in dotted outline in FIG. 22, with a well-known hinge 236 allowing hinged movement of lid 234 with respect to sled 232. Longitudinal openings 238, 240 in the sled 232 and/or lid 234 expose portions of the caps 140 to be melted to each other. A latch or hook 242 on the sled 232 engages with a well-known conveyor or chain 244 that transports the sled 232 carrying the caps 140 past upper and lower lasers 246, 248 during manufacture. Lasers 246, 248 respectively shine through openings 240, 238 and respectively create melted portions 230 on the stacked caps 140 within the sled 232.

The stacked assembly of caps 140 is thus retained together by the melted portions 230 and can be easily loaded into the feeding tower or container of a cap gun. As the gun dispenses each bottom-most cap, as by a reciprocating shuttle or the like, the plastic material of the melted portion holding the bottommost cap to the adjacent cap above will become broken, and the bottommost cap will become separated from the stacked assembly of caps and will be dispensed.

An advantage of this embodiment is that the stacked assembly of caps can be easily removed as a unit from the feeding tower or container of the cap gun if the gun becomes jammed, so as to permit unjamming of the gun with subsequent reloading of the remaining caps of the stacked assembly. Other prior art solutions and other embodiments do not have this advantage that the caps remain held together in a stacked assembly when removed from the cap gun. A further advantage of this embodiment is that no rod or thermoplastic cord or string is required to hold the stacked assembly of caps together.

Various modifications may be made with respect to caps 140 and the stack retaining mechanisms without departing from the scope and spirit of the invention which is defined by means of the appendant claims. It is therefore to be understood that within the scope of the appendant claims the present invention may be practiced otherwise than as specifically described herein.

I claim:

1. A stacked assembly of plastic roofing caps for use with a cap feeding device and adapted for use with a fastener having an elongated shank for securing a roof member to a roof deck, said assembly comprising a plurality of coaxially stacked said plastic roofing caps, wherein adjacent caps are joined together at a melted outer circumferential portion thereof.

* * * * *